(12) United States Patent
Brindley et al.

(10) Patent No.: US 8,459,540 B2
(45) Date of Patent: Jun. 11, 2013

(54) VAULT MANAGEMENT METHOD AND SYSTEM

(75) Inventors: Edward John Brindley, Frimley (GB); Timothy Edward Plumridge, Alton (GB); Roger Norman Gray, Waterlooville (GB)

(73) Assignee: De La Rue International Limited, Basingstoke, Hampshire (GB)

( * ) Notice: Subject to any disclaimer, the term of this patent is extended or adjusted under 35 U.S.C. 154(b) by 150 days.

(21) Appl. No.: 12/735,170

(22) PCT Filed: Dec. 21, 2007

(86) PCT No.: PCT/GB2007/004952
§ 371 (c)(1),
(2), (4) Date: Jan. 4, 2011

(87) PCT Pub. No.: WO2009/081085
PCT Pub. Date: Jul. 2, 2009

(65) Prior Publication Data
US 2012/0145777 A1    Jun. 14, 2012

(51) Int. Cl.
*G06F 17/00* (2006.01)
(52) U.S. Cl.
USPC .......................................... 235/375; 235/379
(58) Field of Classification Search
USPC .... 235/375, 379, 435, 385, 492, 439; 705/22, 705/28; 53/399, 582
See application file for complete search history.

(56) References Cited

U.S. PATENT DOCUMENTS

| | | | |
|---|---|---|---|
| 5,929,412 A * | 7/1999 | Nakatani | 235/89 R |
| 6,513,303 B2 * | 2/2003 | Neri | 53/399 |
| 7,516,601 B2 * | 4/2009 | Horiuchi | 53/582 |
| 8,056,305 B1 * | 11/2011 | Folk et al. | 53/399 |
| 2002/0040865 A1 | 4/2002 | Steinkogler et al. | |
| 2005/0017900 A1 * | 1/2005 | Grimm | 342/357.07 |
| 2005/0150740 A1 | 7/2005 | Finkenzeller et al. | |
| 2005/0209966 A1 * | 9/2005 | Demmeler et al. | 705/45 |
| 2005/0274791 A1 | 12/2005 | Ikeda et al. | |
| 2006/0032917 A1 | 2/2006 | Ritter | |
| 2007/0122023 A1 * | 5/2007 | Jenrick et al. | 382/135 |
| 2007/0229253 A1 | 10/2007 | Langlotz et al. | |
| 2008/0094222 A1 * | 4/2008 | Kaoru | 340/572.7 |
| 2009/0184452 A1 * | 7/2009 | Yoo et al. | 270/1.01 |

FOREIGN PATENT DOCUMENTS

| | | |
|---|---|---|
| EP | 1 111 553 A2 | 6/2001 |
| EP | 1 195 725 A2 | 4/2002 |
| EP | 1 583 047 A1 | 10/2005 |
| EP | 1 628 242 A1 | 2/2006 |
| WO | WO 03/042937 A2 | 5/2003 |
| WO | WO 2005/064553 A1 | 7/2005 |
| WO | WO 2006/056599 A1 | 6/2006 |

OTHER PUBLICATIONS

Apr. 10, 2012 Third Party Submission issued in European Patent Application No. 2 238 578 (with translation).

(Continued)

*Primary Examiner* — Edwyn Labaze
(74) *Attorney, Agent, or Firm* — Oliff & Berridge, PLC

(57) ABSTRACT

A method of processing a plurality of articles of value within a cash processing center comprising sorting a plurality of articles of value according to one or more predetermined criteria, recording data corresponding to the sorted articles of value, physically associating the sorted articles of value with a radio frequency identification device, and electronically associating the data corresponding to the sorted articles of value with data corresponding to the radio frequency identification device.

14 Claims, 22 Drawing Sheets

OTHER PUBLICATIONS

Jan. 27, 2009 International Search Report issued in corresponding International Patent Application No. PCT/GB2007/004952.

Jan. 27, 2009 Written Opinion issued in corresponding International Patent Application No. PCT/GB2007/004952.

* cited by examiner

VAULT MANAGEMENT METHOD AND SYSTEM

The present invention relates to a vault management system for a cash processing centre. In particular, the present invention relates to systems and methods of efficiently transferring articles of value within a cash processing centre and providing comprehensive audit information.

The management of cash and other articles of value is vital for the functioning of a healthy modern economy. Often the processing and management of cash and other articles of value is unseen by the consumer yet plays an important role in a variety of sectors including retail, banking, gaming, and government. Most forms of management involve controlling and securing the circulation of cash, such as banknotes and coins, and other articles of value such as cheques, tokens or bonds.

The circulation of cash is typically centred on the secure deposit and storage of quantities of currency. This process is typically performed at one or more secure storage areas or vaults. These vaults may be a safe or physically secure building. Cash and other articles of value are deposited into a vault and then subsequently retrieved from the vault when required. Each vault may be owned and managed by a bank or cash management company. The vault is typically integrated into a larger cash processing centre which is further responsible for handling and verifying cash deposits and preparing cash withdrawals for delivery to customers. A cash processing centre will operate in association with cash in transit (CIT) organisations which are responsible for the security of the cash to and from the centre.

For example, a large retail establishment, at the end of a period of trading, will typically accrue a quantity of cash and other articles of value through retail transactions. As it is impractical and unsafe to keep this cash on the retail premises the cash will typically be sent to a cash processing centre, such as a bank or central deposit, using a CIT operator. The cash processing centre is then responsible for receiving the cash from the CIT operator and storing it in a safe location. Once the quantities of cash have been verified and stored, the verified total of the deposited cash may be credited to the bank account of the retail establishment. In a similar manner, at the beginning of a period of trading, a retail establishment may order a certain quantity of cash to stock the tills or points of sale. This cash will typically be provided by a suitable cash processing centre nearby. At a time stipulated by the cash order the required quantity of cash will be retrieved from the vault and sent to the retail establishment using a CIT operator. Once the cash has been retrieved from the vault and verified it may then be debited from the bank account of the retail establishment. The same processes are also used by high street banks and post offices.

When operating a cash processing centre there are several inherent problems. The first of these is the difficulty in keeping track and control of all the deposits and orders that flow through the vault. For example, a medium to large cash deposit centre may hold thousands if not millions of pounds in a vault at any one time. With such large quantities of cash it is very easy for orders and deposits to be lost or for cash to be stolen by unscrupulous employees or malicious parties. As the cash processing centre would be liable to pay out for any shortfalls in cash amount there is thus a requirement to keep track of all deposits and to prevent theft and loss.

A second problem that arises when dealing with cash processing, and which especially arises with large quantities of cash, is how to process deposits and orders in the quickest possible time. Quick processing is essential in order to prevent cash shortages in the customers requiring cash and also to prevent backlogs within the cash processing centre itself. Many cash processing centres are often constrained by the hours of opening of modern retailers and banks. For example, it is preferable for customers to send cash amounts for deposit after closing in the evening and receive cash orders before opening in the morning. Additionally, much cash processing occurs when customers are closed on the weekend. Hence there is a requirement to quickly perform a deposit and process cash orders within the cash processing centre, not only to reduce costs, but to keep the supply of cash fluid.

A third problem when dealing with cash processing in a cash processing centre is how to efficiently manage a large number of transactions whilst minimising the cash held on site. Modern large cash processing centres can receive hundreds of orders and hundreds of deposits every day requiring large amounts of available stock. If a large stock is required this will increase the attractiveness of the centre to thieves as well as require large amounts of space to be physically secured.

Unfortunately, most cash processing centres involving a vault operated using antiquated technology and procedures which are not able to address the above problems and are not able to keep up with the demands of a modern economy.

According to a first aspect of the present invention there is provided a method of processing a plurality of articles of value within a cash processing centre comprising:
  a. sorting a plurality of articles of value according to one or more predetermined criteria;
  b. recording data corresponding to the sorted articles of value;
  c. physically associating the sorted articles of value with a radio frequency identification device; and
  d. electronically associating the data corresponding to the sorted articles of value with data corresponding to the radio frequency identification device.

Preferably the method comprises grouping the sorted articles of value with a grouping device, such as a rubber or polymer band or strap or a metal clip. The radio frequency identification device is typically coupled to the grouping device, either by embedding the identification device into the material of the grouping device or by physically attaching the identification device to the grouping device. In some embodiments the method may further comprise: sealing the sorted articles of value within a container; and retrieving data corresponding to the sorted articles of value without unsealing the container by reading data corresponding to the radio frequency identification device from outside the container using a radio frequency reader.

According to a second aspect of the present invention there is provided an apparatus for sorting and grouping a plurality of articles of value comprising:
  a processing unit adapted to sort the plurality of articles of value and to generate processing data;
  a grouping unit adapted to group a plurality of sorted articles using a grouping device, the grouping device being coupled to a radio frequency identification device; and
  a controller configured to associate the processing data corresponding to a grouped plurality of articles of value with data associated with the radio frequency identification device coupled to the grouping device used to group the plurality of articles of value.

Preferably the apparatus further comprises a radio frequency scanning device adapted to read data from a radio frequency identification device. In some embodiments the grouping device may comprise a strap, such as a polymer or rubber band or a metallic clip. The apparatus may also further comprise a second grouping unit to further group a plurality of previously grouped articles of value, i.e. to group a number of grouped units.

According to a third aspect of the present invention there is provided a method of depositing articles of value within a cash processing centre, the method comprising:
  a. recording deposit data at a first location, the deposit data corresponding to one or more articles of value to be deposited at a second location;
  b. electronically associating the deposit data with data stored upon a radio frequency identification device;
  c. physically associating the one or more articles of value to be deposited with the radio frequency identification device;
  d. transporting the one or more articles of value to be deposited to the second location;
  e. reading data from the radio frequency identification device at the second location; and
  f. obtaining the deposit data using the read data.

In some embodiments the step of recording deposit data may comprise: processing the one or more articles of value to be deposited using a banknote sorter; and generating a deposit data record based on processing data provided by the banknote sorter. The step of physically associating the one or more articles of value to be deposited with the radio frequency identification device may also be performed automatically by the banknote sorter. The method may additionally further comprise: processing the one or more articles of value to be deposited using a banknote sorter at the second location; and reconciling the deposit data obtained using the read data with the processing data provided by the banknote sorter at the second location.

In some embodiments the step of electronically associating the deposit data comprises writing data to the memory of the radio frequency identification device and the step of obtaining the deposit data comprises obtaining deposit data using data read from the memory of the radio frequency identification device. The data stored upon the radio frequency identification device may comprise a unique identifier and obtaining deposit data may comprise reading the unique identifier from the radio frequency identification device and using the unique identifier to retrieve the deposit data. Retrieving deposit data may additionally comprises retrieving deposit data from a central database using the unique identifier as an index.

According to a fourth aspect of the present invention there is provided a method of tracking one or more articles within a cash processing centre, the cash processing centre comprising a plurality of receivers for radio frequency communication, the method comprising:
  a. coupling a radio frequency identification device to an article, the radio frequency identification device having an unique identifier;
  b. receiving a radio frequency signal from the radio frequency identification device at at least two receivers, the radio frequency signal comprising the unique identifier;
  c. using the received radio frequency signal, together with the received unique identifier, to determine the location of the radio frequency identification device; and
  d. updating the location of the article based on the location of the radio frequency identification device.

In some embodiments the method uses trilateration, wherein the cash processing centre comprises at least three receivers for radio frequency communication and the method further comprises: receiving a radio frequency signal from the radio frequency identification device at at least three access points; and using the signal strength of the received radio frequency signal received at each receiver, together with the received unique identifier, to determine the location of the radio frequency identification device. In other embodiments the receivers comprise directional receivers and step c) comprises determining the location of the radio frequency device using triangulation. The located article may be one of: a cage, a scanning device, an employee, one or more articles of value, a container, a trolley, or a banknote sorter.

According to a fifth aspect of the present invention there is provided a storage unit for containers for use in a cash processing centre, the containers containing one or more articles of value, the storage unit comprising:
  a storage area for one or more containers,
the storage unit characterized by:
  one or more radio frequency reading devices configured to wirelessly read data from a radio frequency identification device;
  wherein, in use, each container has an associated radio frequency identification device, the radio frequency identification device storing data associated with properties of the articles of value within the container; and
  in use, the properties of any articles of value stored upon the storage unit may be retrieved by processing data read by the one or more radio frequency reading devices.

According to a sixth aspect of the present invention there is provided a method of tracking articles of value within a cash processing centre comprising:
  a. coupling one or more articles of value with a first radio frequency identification device;
  b. coupling a unit adapted to store articles of value with a second radio frequency identification device;
  c. reading data associated with both the first and second radio frequency devices; and
  d. recording that the one or more articles of value are stored upon the unit based on the read data.

Several examples of a number of methods and systems according to the present invention will now be described with reference to the accompanying drawings, in which.

Figure 1A:
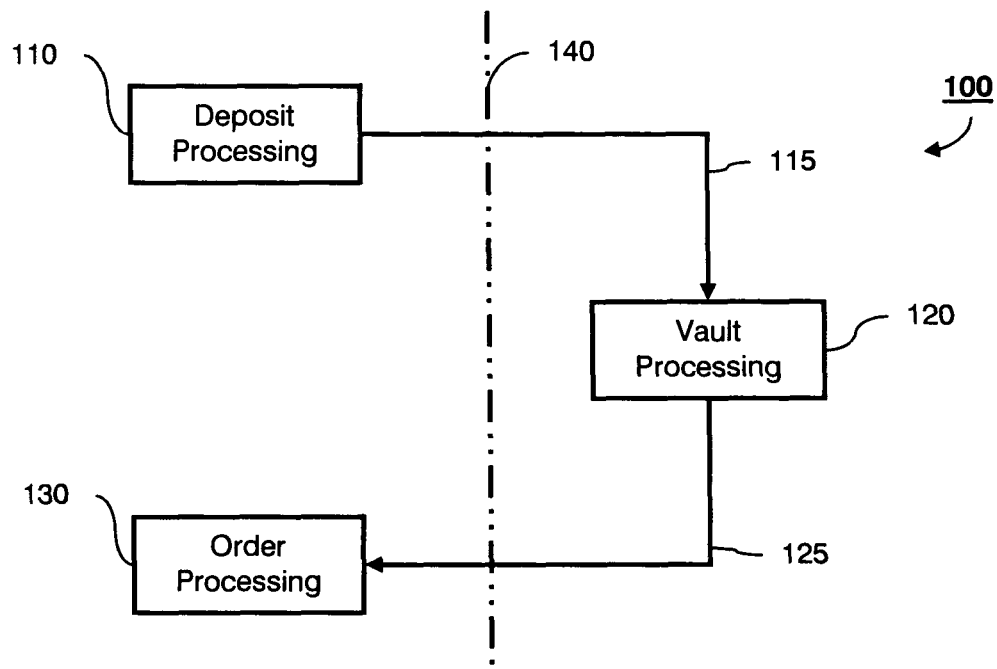
FIG. 1A is a process diagram of an exemplary cash processing cycle according to a first embodiment of the present invention.

FIG. 1A displays a number of processes involved in the management of a vault within a cash processing centre according to a first embodiment of the present invention. The cash processing cycle 100 therein is configured to complement the typical physical layout of a cash processing centre. The cash processing centre may be run by a variety of organisations. These include central banks, commercial banks, cash in transit (CIT) companies and transport and leisure companies. A schematic diagram of the ground plan of an exemplary cash processing centre is shown in FIG. 1C. This ground plan is provided as an example only and other differing cash processing centre designs may also be used with the management processes of the present invention. Cash deposit centre 105 comprises secure vault area 121, deposit area 111 and order processing area 131. The secure vault area 121 may comprise, but is not limited to, a safe, a physically secure room or a physically secure area. The deposit area 111 is an area for preparing cash for deposit into the vault and the order processing area 131 is an area for preparing cash orders. The deposit area 111 and the order processing area 131 are separated from the vault area 121 by a physical boundary 141. Physical boundary 141 has two respective openings: entry point 116 into the vault area 121 and exit point 126 into the order processing area 131. These entry and exit points may be provided by one way doors or other suitable secure gateway apparatus. Deposit area 111 may also be separated from order processing area 131 by physical boundary 142, although in some implementations the two areas may comprise a single room.

The cash processing cycle 100 has three processes that are typically performed in the three respective areas of FIG. 1C. However, it is possible that all three processes may be carried out within the secured boundary of the vault. The cash processing cycle 100 first comprises deposit processing 110. This step is typically performed in the deposit area 111, wherein cash and other articles of value are prepared for deposit into the vault or secure area 121. This preparation may involve: unloading cash from containers; counting, verification and validation; and preparing the cash in a suitable form for deposit, such as bundling the notes in set quantities of denominations. The articles for deposit may comprise articles of value such as coins, banknotes, cheques, tokens or bonds. The flow of cash into vault is illustrated by arrow 115. This represents the physical passage 117 of cash from the deposit area 111 to the vault 121 via entry point 116. Boundary line 140 represents a figurative boundary between the stage of deposit processing 110 and the vault processing 120. Boundary line 140 may reflect the physical boundary 141 between the deposit area 111 and the vault 120 or may simply be a means of delimiting the two processes. The figurative boundary is used as part of the transfer process described in relation to FIG. 3.

The cash processing cycle 100 next comprises vault processing 120. At this stage cash received by the vault 121, for example via entry point 116, may be further counted, verified and validated and placed in bundles of denominations suitable for storage. The vault 121 may comprise one or more cash deposit apparatus such as a TCR (Teller Cash Recycler) Twinsafe or "Vertera"™ apparatus supplied by De La Rue International. Alternatively, the vault 121 may comprise a regular safe or vault, wherein documents of value are routed in and out of the safe or vault by hand. In this case vault processing 120 may involve depositing received cash into a suitable deposit apparatus. Cash remains in the vault 121 until it is required to fulfil a cash order. At this point the vault processing 120 involves preparing the required amount of cash to send for order processing 130. The flow of cash from the stage of vault processing 120 to the stage of order processing 130 is represented by arrow 125 and again involves the crossing of figurative boundary 140. This transfer 125 may reflect the physical removal 127 of cash from a safe or secure area 121 via exit point 126 and the transfer of this cash across physical boundary 141 to the order processing area 131.

The third stage of the cash processing cycle 100 is order processing 130. At this stage, quantities of cash are prepared to supply customers, such as, amongst others, retailers and banks. A cash order may be scheduled regularly in the manner of a standing order or may be prepared individually based on a received order. The quantity of cash received from the vault area 121 will typically be counted, bundled and placed in suitable containers or bags for delivery.

Figure 2A:
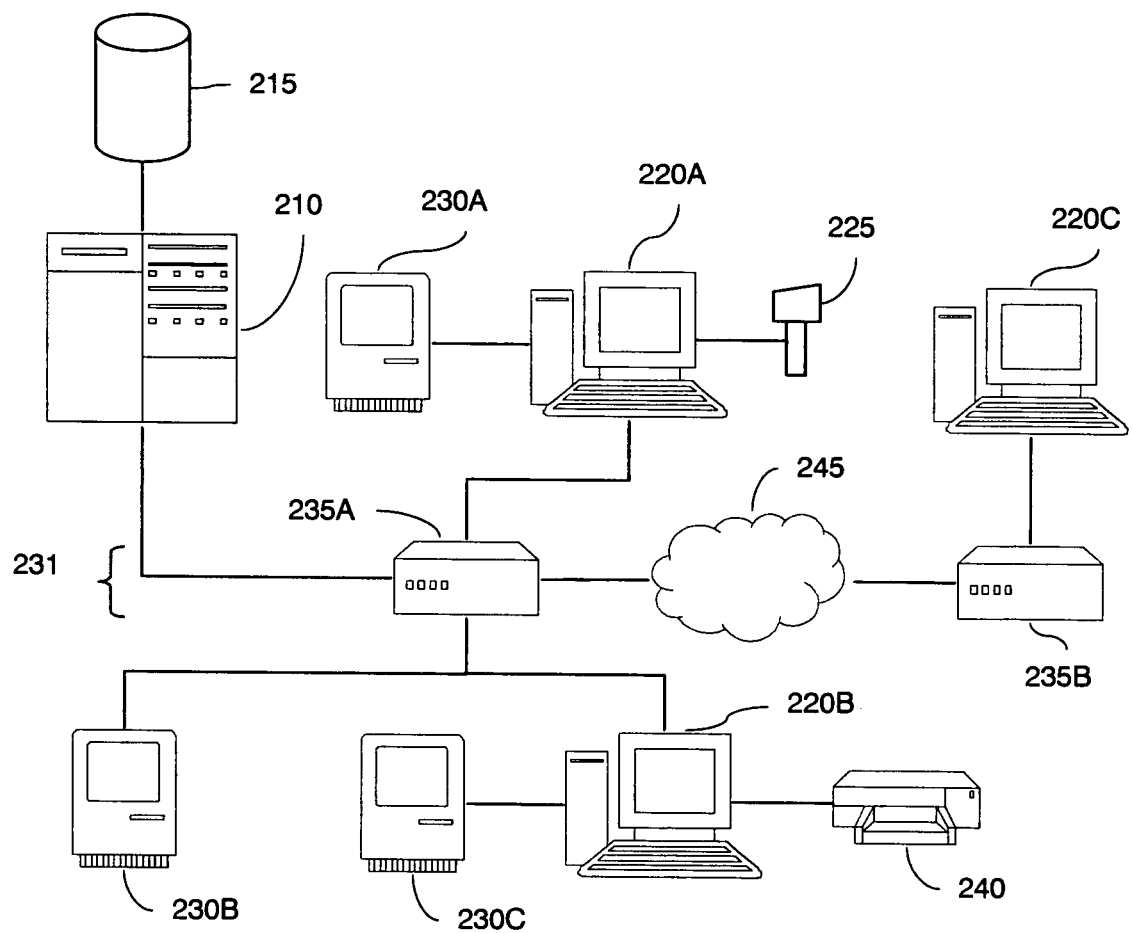
FIG. 2A is a diagram illustrating an exemplary hardware configuration for implementing the first embodiment of the present invention.

An example of suitable hardware that may be used to implement the present invention is illustrated in FIG. 2A. Vault management system 200 comprises a vault management server 210 upon which the vault management software operates. The vault management server 210 is operably connected to database 215. The database may be stored on one or more local or remote storage mediums or devices. Typically, vault management server 210 comprises a standard hardware configuration running Microsoft Windows 2000/2003 or an Oracle-supported host and database 215 comprises an Oracle or SQL Server compatible database. However, any suitable software platform known in the art may be used to implement the invention. The processes used to generate data records and populate the vault management database are discussed subsequently. Sources of data include, but are not limited to, order forecasting systems, high-speed banknote sorters, coin sorters, desktop banknote and coin sorters, document capture systems, CIT providers, remote bank and/or store locations. The vault management database may also be adapted to interface with internal or external accounting or data warehousing systems.

Vault management server 210 typically further comprises a network adapter to connect to a wired or wireless network 231, using standards such as Ethernet or 802.11g. Network 231 is typically a local area network (LAN) covering the cash processing centre 105. In FIG. 2A network 231 comprises a first network hub 235A connected to a second network hub 235B over a wide area network (WAN) 245. Vault management server 210 may be connected to first network hub 235A via a LAN connection as shown in FIG. 2A or alternatively may be located remotely to the cash processing centre 105 and connected to first network hub 235A via a WAN connection. The network 231 is presented as an example and any suitable form of network topology may be used in practice. Network hub 235A is connected to a number of networked devices 220 and 230 and these network connections may also be wired or wireless using known protocols. The network may also be secured using methods known in the art.

Networked devices 220 and 230 comprise networked client workstations 220A and 220B. Such workstations are typically located in the areas of the cash processing centre 105 shown in FIG. 1C: for example workstation 220A may be located in deposit area 111 and client workstation 220B may be located in order area 131. Additional peripherals may also be connected to client workstations 220. In FIG. 2A client workstation 220A is connected to barcode reader 225 and client workstation 220B is connected to print device 240. Any number of peripherals may be connected to a client workstation using any known protocols.

A number of banknote counters 230 may also be connected to the network 231, either through client workstations 220A and 220B or through using a banknote counter 230B with network capability, such as counter 230B, connected to the network 231 via network hub 235. These banknote counters may be a 2600, EV86, Evolution™, nVision or Kalebra model counter manufactured by De La Rue International Limited or may be any suitable one, two or three or more pocket counter that is adapted to count, validate and/or process batches of banknotes. Networked banknote counter 230B may be located in the any of the cash processing centre areas shown in FIG. 1C.

The example shown in FIG. 2A is for illustrative purposes only and the number of client workstations 220 and/or counting devices 230 may vary according to the particular cash deposit centre involved. For example, the deposit area 111 may comprise two or more client workstations 220A wherein each workstation is connected to a barcode reading device 225 and a print device such as print device 240. Alternatively the deposit area 111 may comprise a plurality of banknote counters 230 all connected to network 231.

Vault management system 200 may also comprise a remote client workstation 220C as shown in FIG. 2A. This is an optional feature and need not be included in all implementations. This workstation is connected to hub 235B which is connected to the network 231 via a wide area network 245 such as the Internet. Typically, security will be enforced by using a virtual private network (VPN) operating on top of standard communication protocols, such as TCP/IP. Client workstation 220C then allows access to the vault management software running on server 210 from a remote location.

The vault management system of the present invention is implemented using a number of integrated software modules that correspond to each of the processing stages illustrated in FIG. 1A. For example, a system based on FIG. 1A comprises three modules corresponding to stages 110, 120 and 130. These software modules may be wholly or partly implemented as software processes or interfaces running on vault management server 210. Each client workstation 220 is able to connect to the vault management server 210 and may be a fat or thin client. Each module typically has its own user interface, typically a graphical user interface (GUI), that is presented to an operator working upon one of the client workstations 220. Each workstation 220 may be restricted to only show the GUI relevant to the area in which the workstation is located, for example workstation 220A may be restricted to only show an operator the GUI associated with the deposit processing module. Each module allows the system to acquire data related to one of the three processing stages, the data being acquired by processes performed by an operator interfacing with the GUI of the relevant module.

As well as a suite of modules corresponding to each of the cash management processes of FIG. 1A the vault management software may also optionally comprise a number of additional modules that enable customisable configuration and provide standing data used by the system. These modules may be one or more of: a security module for managing user access and authorisation levels; a definitions module to manage administration of specific terminology and fixed data; a GUI configuration module to manage the appearance, behaviour and dynamics of each GUI; and a customer database to manage customer specific data reference by the vault management software.

The operations performed in the deposit processing 110 will now be described in relation to FIGS. 5A and 5B. The deposit processing 110 is performed on one or more quantities of cash that have been received from outside of the cash processing centre. The cash is received in one or more containers that can vary in size and form. These containers may be organised in a nested hierarchy. For example, the cash processing centre may use cages, bulk bags and satchels, wherein a cage may hold one or more bulk bags and a bulk bag may contain one or more satchels. Alternatively, the cash processing centre may use containers, bags and envelopes or a combination of all six container types. Each of the containers may have its own individual identifier, for example in the form of a serial number encoded within a barcode present on the outside of the container.

Each received quantity of cash has an associated deposit slip. This deposit slip lists one or more properties related to the received cash, for example, the originating customer or depositor, the declared deposit amount and the date of deposit. Each container containing a quantity of cash also contains a deposit slip. Containers containing other containers may also contain deposit slips relating to the cumulative deposit amount of all contained containers. The deposit slip may also further comprise a one or two dimensional barcode. This barcode may encode a serial number or actual deposit information. At the deposit stage the quantity of cash within each container is linked to the depositor and verified against the deposit amount declared on the deposit slip.

Figure 5A:
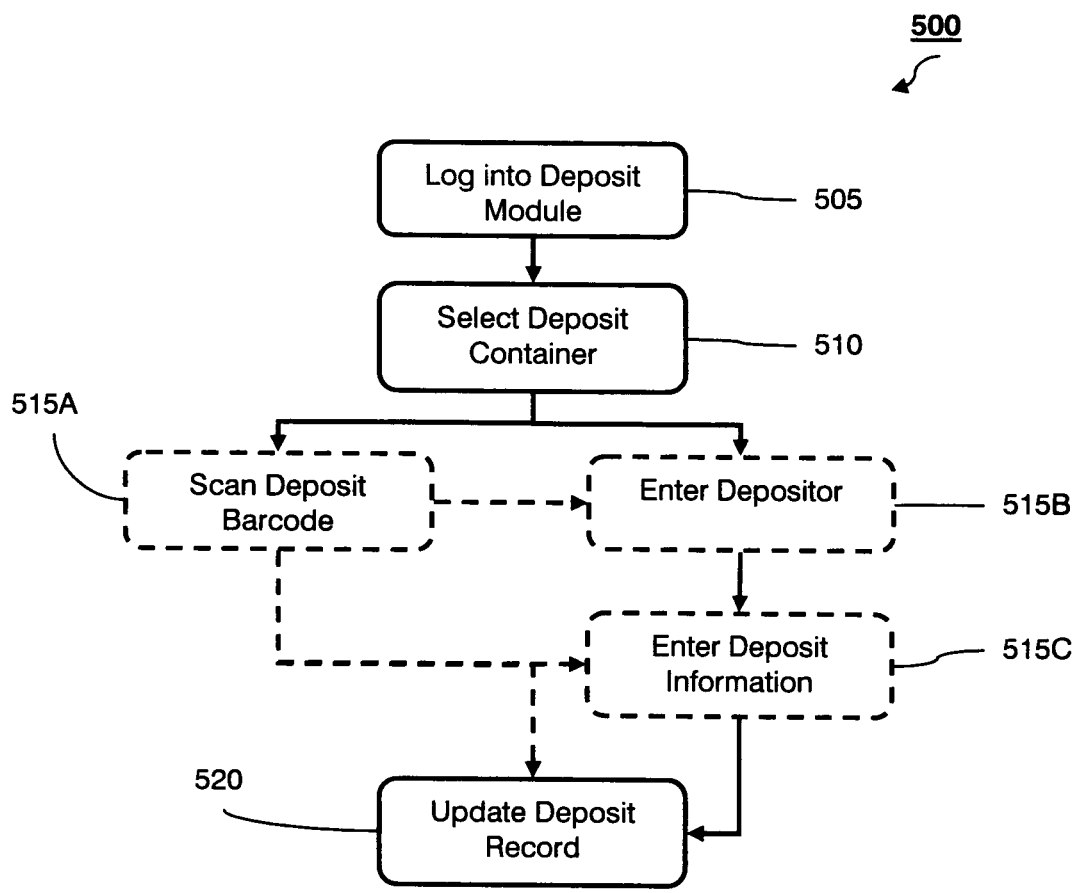
FIG. 5A is a flow chart demonstrating an exemplary cash deposit operation according to a first embodiment of the present invention.

FIG. 5A shows a method for obtaining the deposit data associated with a deposit. At step 505 an operator logs into the deposit module using a client workstation, such as workstation 220A. The login procedure may involve entering a user name and password. In some embodiments the workstation 220A may be connected to a biometric device adapted to read a biometric identifier associated with the operator. This identifier may be a finger print, a finger or palm vein structure, an iris scan or a voice print (amongst others). Hitachi Ltd provides a number of reading devices which may be used to read the biometric identifier. The biometric identifier is then used instead of a username and/or password to log in to the relevant software module.

The operator then selects a deposit container for deposit processing 510, opens the container and retrieves the deposit slip. A new deposit record is then created if no pre-existing record exists. The information present on the deposit slip is then obtained 515 using one or more of automatic means, for example scanning a barcode 515A present on a deposit slip or applying optical character recognition (OCR) to a captured image of the deposit software, or using manual means, for example entering the information 515B, 515C into the deposit module GUI. As a deposit operator will regularly spend a large proportion of their time entering deposit information all functions within the deposit module are accessible with keystrokes or by assigning hot keys. If a barcode is present then the operator can use a barcode scanner 225 to either retrieve a serial number or the deposit data itself. A serial number may be linked to a deposit record generated by the depositing customer or may identify the depositor. Other data that may be recorded include a till, cashier, store or branch identifier. Once the depositor information has been entered then the deposit record is updated 520. If it is not assigned already the cash deposit is assigned to the current operator by associating an operator identifier, such as a user name, with the deposit record. This may be achieved by associating the user name of the current active operator with the deposit record. A cash deposit may also be assigned to an area, for example deposit area 111, as well as, or instead of an operator. This makes the current operator and/or area responsible for the cash deposit until a transfer is performed.

The data present on the deposit slip may also be obtained using pre-advisement. Pre-advisement involves the customer pre-advising the cash processing centre on the nature of a deposit. Typically, this may be performed using a web interface wherein the customer enters the deposit amount and container identifiers while preparing the deposit. This deposit data is then linked to the cash processing centre receiving the deposit. When a container is subsequent sent and received by the cash processing centre the pre-entered deposit information can be retrieved upon container identification, e.g. when the containers making up the deposit are scanned by an operator.

After initial deposit processing a count and verification process begins. The count and verification process is illustrated in FIG. 5B and is performed by an operator interacting with an adapted GUI of the deposit module. The method 501 begins at step 520 with the retrieval of cash, typically in the form of banknotes, from the selected deposit container. The cash is then counted at stage 535. Counting may be performed manually or, as is typically the case, may be performed by an on-line or off-line banknote counter 230. If the cash processing centre is configured to receive and process cheques then cheque imaging systems and software may also be integrated into the vault management system to provide count information for cheque deposits.

In a manual count the operator counts and inspects the cash from the container and enters the results of the count into the deposit module GUI. Typically, the cash is sorted into a number of denominations and the total number of notes and cash value of each denomination is recorded. The fitness of each note can also be inspected and the serial numbers recorded. If a banknote counter 230A is currently connected to the client workstation 220 at which the current operator is operating, i.e. is on-line, this will be shown within the deposit module GUI and the banknote counter can be used to generate data documenting characteristics of counted notes. These can be, amongst others, denomination, fitness, and authentication characteristics. To use an on-line banknote counter the operator places the retrieved banknotes on banknote counter 230A. The banknote counter 230A is then able to count and/or verify the banknotes and the data generated by the banknote counter 230A is sent back to the client workstation 220A to populate the count data at stage 540. Alternatively banknote counter 230A can be disconnected from the client workstation 220A, i.e. used off-line. In this case the banknotes will still be counted by the banknote counter but the operator will manually enter the data on the banknote counter display. If the banknote counter 230A is adapted to authenticate the banknotes and identify counterfeit notes then data related to counterfeit notes may either be passed automatically to the deposit module from the banknote counter if the counter is on-line or may otherwise be manually entered into the adapted deposit GUI based on data presented to the user on the banknote counter display. Data on counterfeit notes can then be printed by a user or supervisor to comply with legal reporting requirements. If an error occurs when using a banknote counter an operator is also able to edit any captured data manually by interfacing with the deposit module GUI.

After the banknotes have been processed at step 535 and the count data has been populated at step 540 the populated count data is compared with the deposit amount entered into the deposit module from the deposit slip. This is performed at step 545. At this stage, to provide extra security, the result of the comparison may be reviewed by a supervisor at step 550. If this is the case a supervisor is summoned and logs into the vault management system. Once the supervisor is logged in they are presented with a screen summarising all information relevant to the current deposit. They are then able to review any difference found between the counted amount and the amount on the deposit slip. If a difference is found at step 555 then this is displayed to the supervisor and the supervisor is asked to enter a reason for the difference at step 560. If no difference is found then the supervisor may be asked simply to confirm the count data. Whatever the result, the supervisor then captures an image of the deposit slip at step 565. This may also be performed by the operator. This typically involves placing the deposit slip underneath a digital camera connected to client workstation 220A. The digital camera is adapted to take a picture of the deposit slip and store it with the deposit record in deposit database 215. After the count has been performed the operator in the deposit processing area 111 the cash is transferred to the vault area 121. Typically, after processing, the cash is retained in a secure container whose ownership is attributed to the operator, machine or area responsible for deposit processing.

Figure 3A:
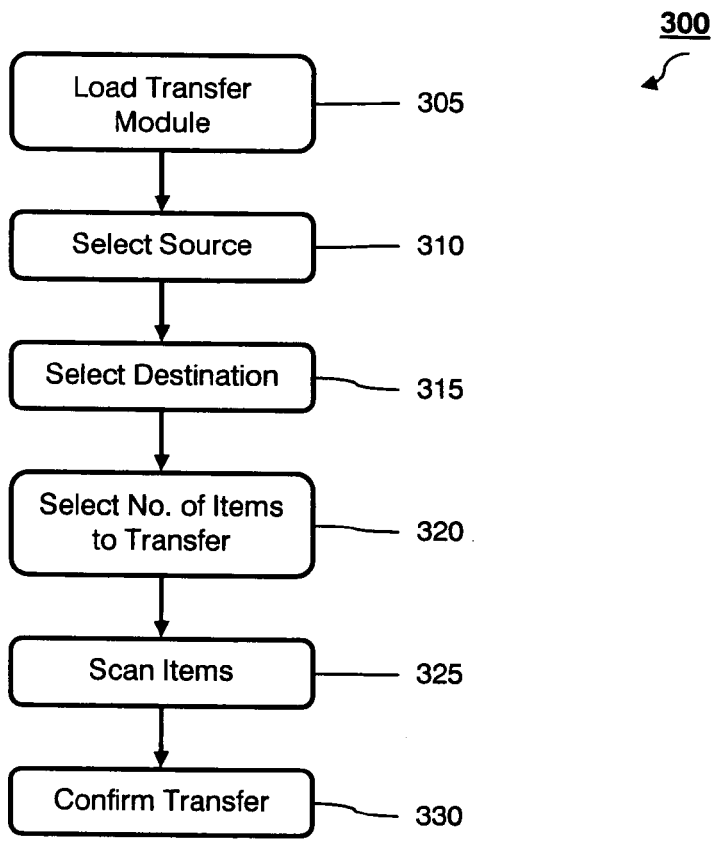
FIG. 3A is a flow chart demonstrating an exemplary transfer process according to the first and second embodiments of the present invention.
Figure 3B:
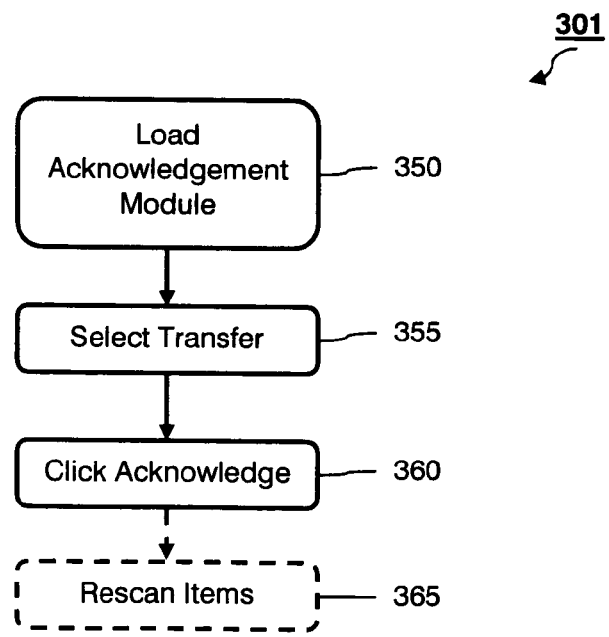
FIG. 3B is a flow chart demonstrating an exemplary acknowledgement process according to the first and second embodiments of the present invention.

The transfer of cash from the deposit area 111 to the vault area 121 involves a transfer process as illustrated in FIGS. 3A and 3B. The transfer process is used to transfer responsibility for the cash deposits from deposit processing 110 to vault processing 120. The transfer process performed by the party wishing to transfer a cash deposit, in this case an operator DP within deposit area 111, is shown in FIG. 3A. The operator begins by initiating a transfer module upon client workstation 220A as shown in step 305. The operator then selects the source of the transfer in step 310. The source may be an individual, an area or a safe, a safe being a subdivision of the vault. The selection may be achieved by either selecting the relevant user name or area from a dropdown list, retrieving the current logged in user name or area from the client workstation operating parameters. Once the source of the transfer has been selected the containers and/or cash deposits currently assigned to the source may be displayed to the user via in an information panel within the GUI.

At step 315 the operator selects a destination, which may also be an individual, an area or a safe, a safe being a subdivision of the vault. For example, the destination may be a user V in the vault area 121. This selection may again be made through the use of a dropdown menu. Once a user and/or area have been selected as a suitable destination the containers and/or cash deposits belonging to the selected destination may be displayed in an information panel.

Once the source of the transfer and the destination of the transfer have been selected in steps 310 and 315, the number of items to transfer is then entered in to the transfer module GUI at step 320. These items can be containers or discrete bundled quantities of banknotes representing a cash deposit. As discussed previously each container has an identifier and this identifier can be in the form of a barcode. Each bundled quantity of cash may also have an identifier in the form of a barcode. Once the number of items to transfer has been entered at step 320, the identifiers corresponding to the items that are to be transferred are entered into the transfer module GUI. For example, if barcodes are used these can be scanned at step 325 to obtain serial numbers identifying each item. As each item is identified it may be passed across the physical boundary 141 separating the deposit area 111 from the vault area 121. Each identified item is counted and the total number of identified items is compared with the quantity entered in step 320. Once all the items for transfer have been identified then the transfer is confirmed at step 330.

In order to complete the transfer process a transfer must be acknowledged by or at the destination. In the present example, this could be operator V in the vault area 121. An acknowledgement can be performed in one of three ways:

The system can be set up to automatically acknowledge any transfers as soon as they have been confirmed by the operator at step 330.

The receiving party can follow the steps shown in FIG. 3B. At step 350 the destination operator logs into the vault management system via a client workstation 220 and initiates an acknowledgement module 350. In certain configurations the acknowledgement module automatically identifies the current user and/or destination area based on the operating parameters of the current client workstation and in other configurations the acknowledgement displays a series of users, areas or safes for the operator to select. Once one of a user, area or safe has been selected the current number of transfers awaiting acknowledgement are displayed. The operator then selects one of these transfers at step 355 and interacts with the GUI of the acknowledgement module to acknowledge the transfer.

In addition to the steps of FIG. 3B described above the receiving party may also re-identify the items at step 365 in order to acknowledge the receipt. For example, the barcodes of two bulk bags received from the deposit area 111 may only be acknowledged when their barcodes are scanned using a barcode scanner 225 connected to a client operating system 220 present in vault area 121. This option is the most secure and means that items can only be acknowledged once they are physically received.

This transfer process described above manages the physical responsibility or "ownership" of containers and/or cash deposits. This allows all physical movements of containers and/or cash deposits between operators and/or areas of the cash processing centre to be recorded by the vault management system as database records. The vault management system running on vault management server 210 stores records of each transfer and each acknowledgement in database 215. Thus these records can be queried at any time in order to investigate a transfer process. For example, if a transfer has been initiated by one party but the transfer has not been received by a second party then the transfer records for the initiated transfer can be examined and details such as the container identifiers, cash amount, date, time, user and/or area can be retrieved to aid investigation.

Once the cash is in the vault area 121 it will often be processed and stored. This may involve removing the cash and re-bundling sets of banknotes in set bundles of a particular denomination and a particular fitness. For example, banknotes may be sorted into those that are fit for automatic teller machines (ATMs) or those that comply with the Banknote Recycling Framework (BRF).

The vault management system further comprises a vault module that allows the physical inventory of the vault or secure area of the cash processing centre to be accurately represented in real time. As all cash deposits are transferred to the vault the vault module is able to calculate the exact quantity of cash within the vault by using the count and denomination records, linked to the transferred item, that were generated during deposit processing 110. To facilitate management of the vault inventory the vault module further has the ability to generate virtual areas or safes within the vault area 121. Items such as containers or bundled quantities of cash can then be assigned to specific virtual areas through the transfer process of FIGS. 3A and 3B. For example, virtual areas could be generated to hold reserve notes, new notes, coins, ATM fit notes, notes for a particular customer, notes for destruction, old issues of notes, containers, bags, cages, or to represent designated areas such as processing areas or order preparation areas. This can enable management to view all available cash of a given type at a given time, for example all ATM fit cash and then manage the cash flow process accordingly. These virtual areas may have a physical counterpart but this need not be the case, so quantities of cash present in a set physical area of the vault may belong to different virtual areas or safes.

Vault processing 120 may also involve reclassification of cash media. For example, 100×$1 coins may be reclassified as a 1×$100 rolled coin package. This can help to simplify and refine later order processing. Alternatively, if fitness and authentication sorts are not performed as part of the deposit processing 110 then the resultant quantities of cash will be set as "unclassified". Within vault processing 120 these quantities of cash can be further sorted for fitness and authentication and the results of the sort process can be used to perform the media reclassification. This can enable the true state of the cash or media within the vault to be ascertained. Additionally, by altering the stage at which media classification is performed the processing workload can be actively split between deposit and vault processing.

Figure 6:
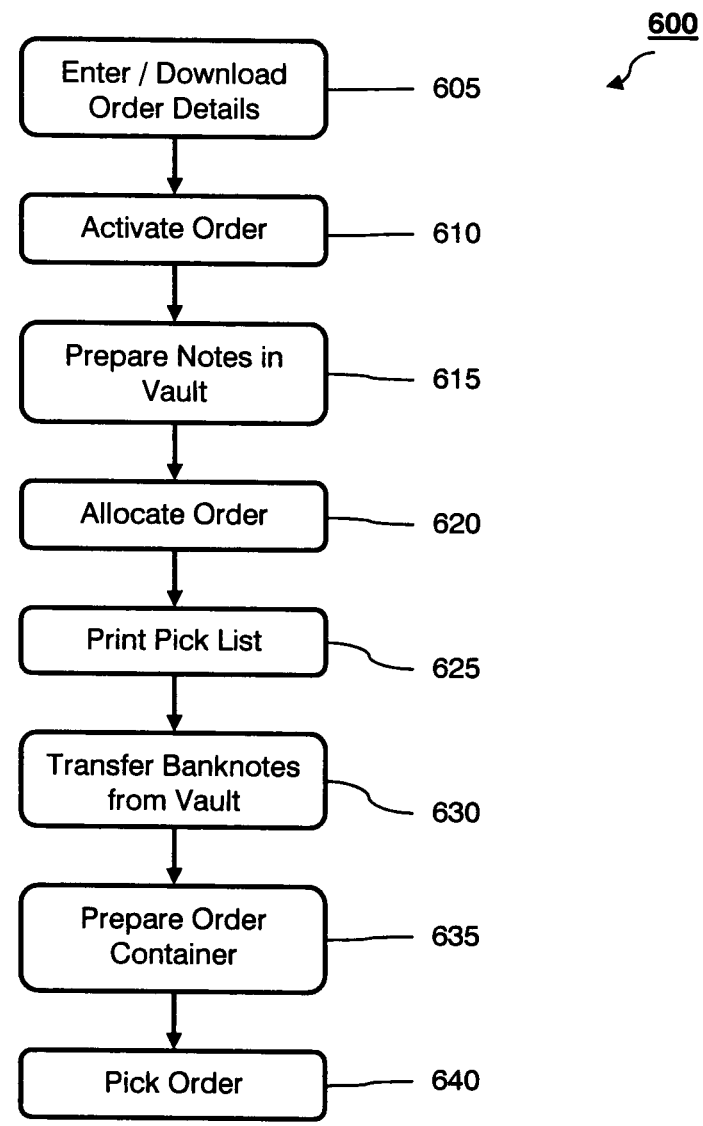
FIG. 6 is a flow chart demonstrating an exemplary cash order processing operation according to a first embodiment of the present invention.

Cash remains in the vault area 121 until it is required to fulfil a cash order. FIG. 6 illustrates the steps involved in order processing 130. A cash order comprises a request for a set quantity of cash from a customer. This request may be for a variety of articles of value, such as coins, notes or bonds and may also include an order for associated servicing, such as ATM servicing. At step 605 the details of the cash order are received or generated. Cash orders may be one off orders or may be part of a regular standing order. Cash orders are stored as records in an order database which may be implemented as part of vault management database 215. Orders may be received via a variety of communication means, for example facsimile, telephone, email etc, and may be manually or automatically entered into the order database. Orders may also be automatically generated based on forecasting systems that interface with the cash management system.

Once a cash order is received an order processing module verifies the customer making the request and checks that the customer is on, or can be assigned to, a valid delivery route. The delivery date of the order is also checked to confirm that it is possible make the delivery and if the delivery date is not possible an error is returned. The order amount is checked against the inventory of the vault 121 to confirm that there is enough stock to complete the order. Orders are then queued and grouped by delivery date.

Before an order can be prepared it needs to be activated and allocated to an operator within the cash processing centre. This is typically performed by a supervisor using a client workstation such as client workstation 220B within the order processing area 131. The supervisor logs into an order preparation module, which forms part of the order processing module, and is presented with a list of orders available for preparation. Commonly, the list is filtered to show a subset of orders, for example those needing to be prepared for the current day, and the supervisor can view the details of each order by selecting one of the list. To activate an order at step 610 the supervisor selects the order from the list and confirms that it is to be activated. At this stage orders can be assigned one of a plurality of types which will dictate any special preparation requirements. Once an order is activated its status is changed to awaiting preparation. This status change is a one way process and activated orders cannot be modified or deleted.

Once an order has been activated operators within the vault area 121 prepare the cash required to make up the order. At this stage the system may also perform an inventory check. This may involve counting out the amount of cash stipulated in the order. After the cash has been prepared it awaits collection by an operator from the order processing area 131.

Meanwhile, after activation of the order, the supervisor proceeds to allocate the cash order to a user and/or an area. Typically, this is an operator within order processing area 131. To allocate an order at step 620 the supervisor selects an activated order and then selects the required user and/or area in a similar manner to the selection of a destination in the transfer process. It is also possible to allocate more than one cash order. Once an order has been allocated then a pick list or manifest can be printed at step 625. The pick list contains details of the cash order and may have a barcode encoding a unique serial number associated with the order. Typically, the pick list is printed by the printing device 240 connected to the client workstation 220B within the order processing area 131. The pick list may comprise a number of individual manifests corresponding to each required container.

Once the responsible operator receives the pick list they are able to retrieve the cash required to make up the order from the vault. This requires a transfer process 630 as shown in FIGS. 3A and 3B. The printing of a print list at stage 625 may automatically generate a transfer process to transfer banknotes from the vault area 121 to the order processing area 131. Alternatively the transfer process can be performed by an operator in the vault area 121 at the request of the order processing operator. In any case, the stages in FIG. 3A are performed with regard to a number of prepared bundles of banknotes. The operator within the order processing area 131 then receives the banknotes and the transfer process can be acknowledged by the order processing operator as shown in FIG. 3B.

At step 635 a number of containers required to hold the cash order are prepared. The number and type of containers required may be calculated automatically when the order is activated and may be present on the pick list. For example, orders can be supplied in cassettes, bulk bags or satchels. The containers are retrieved from a stock of fresh or un-used containers and these may be present in the order processing area 131 or may be retrieved from the vault area 121. As with received deposits, each container is typically assigned a unique identifier. This may be encoded as a barcode. The barcode may already be present on the container or the client workstation 220B within the order processing area 131 may generate and print new barcodes using a connected label printer. Hence, before picking an order the allocated operator is provided with a pick list, a number of identified containers and a quantity of cash from the vault.

An activated order can only be prepared by an allocated operator. Hence the picking process begins when the allocated operator logs into a client workstation, such as workstation 220B, in order processing area 131. The allocated operator is then presented with an order preparation screen. This displays all pending orders that have been allocated to the current operator in an information panel. To perform the picking process at step 640 the allocated operator first selects a pick list and enters the pick list identifier. This may involve scanning the barcode present on the pick list. The entering of the identifier brings up the details of the order on the operator's screen. These details include the number of containers required and the amount of cash or number of banknotes to be placed in each container. The operator begins with a first order container and enters the container identifier associated with the first order container. This may involve scanning a barcode related to that container. The operator is then informed of the quantity of cash to be placed within the container. If the cash is in the form of bundled banknotes a number of bundles can be taken and placed into the container to pick the order. If the cash is provided in the form of a heterogeneous group of banknotes or other documents then the cash may be counted by an attached banknote counter, such as counter 230C. If said counter is connected to the client workstation then the order processing module may automatically pass the required count amount to the counter. The operator then need only place a quantity of banknotes upon the counter and the required amount will be counted into an appropriate output hopper. The operator can then simply remove the banknotes from the output hopper and place them in the associated container. If each container has its own manifest or the order is complete, the appropriate pick list is placed within the container and the container is then sealed. The pick process is then repeated for any additional containers that make up the order.

After the picking process a balance is calculated for the user based on a comparison of the quantity of cash received from the vault with the quantity of cash placed within the one or more containers. These quantities should be equal and if they are not then a supervisor can be called over to log in and confirm the reason for this difference. If an error occurs during the picking process then picked quantities of cash can be retrieved from assigned containers but the associated container identity is destroyed and a new container identity is generated. The end result of the order processing process 130 is one or more containers filled with a quantity of cash that fulfils a given customer order.

Figure 1B:
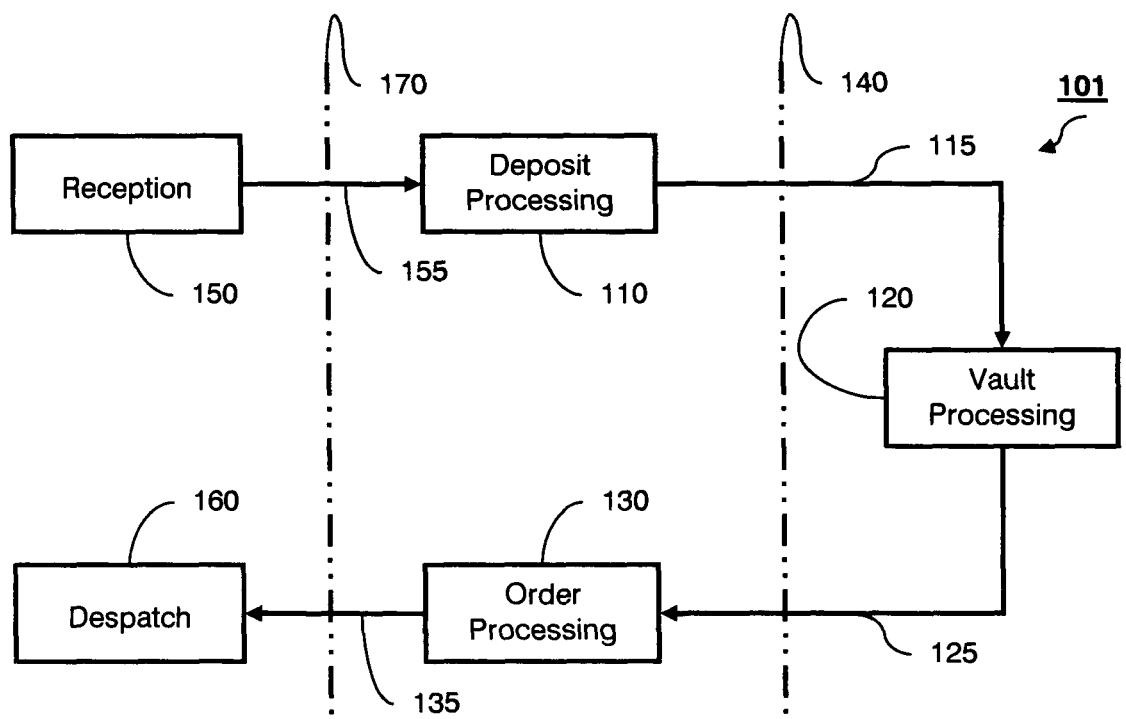
FIG. 1B is a process diagram of an exemplary extended cash processing cycle according to a second embodiment of the present invention.
Figure 1C:
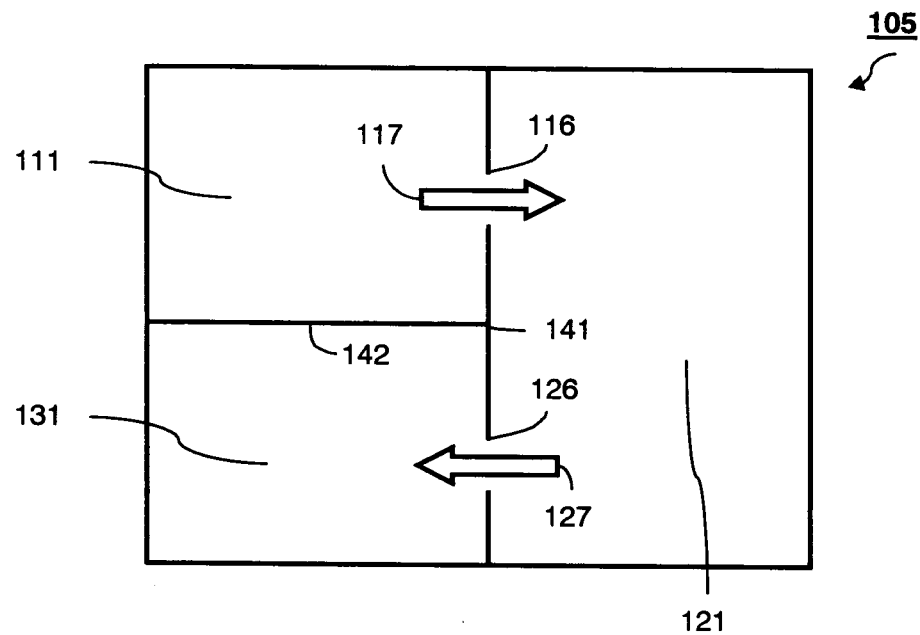
FIG. 1C is a schematic diagram of an exemplary cash processing centre configured to implement the first embodiment of the present invention.

FIG. 1B illustrates an extended cash management process 101 according to a second embodiment of the present invention. This process 101 provides an extension to the cash management process 100 shown in FIG. 1A. The extended cash management process 101 further comprises the processes of cash reception 150 and cash despatch 160. The incoming delivery of cash deposits and the outgoing despatch of cash orders may be performed by the same organisation that runs the cash processing centre or may be performed by a third party. Although the present example is described with the inclusion of the reception 150 and despatch 160 stages it should be noted that these stages are optimal and the present invention can be implemented using any of the stages shown in FIG. 1A.

Figure 1D:
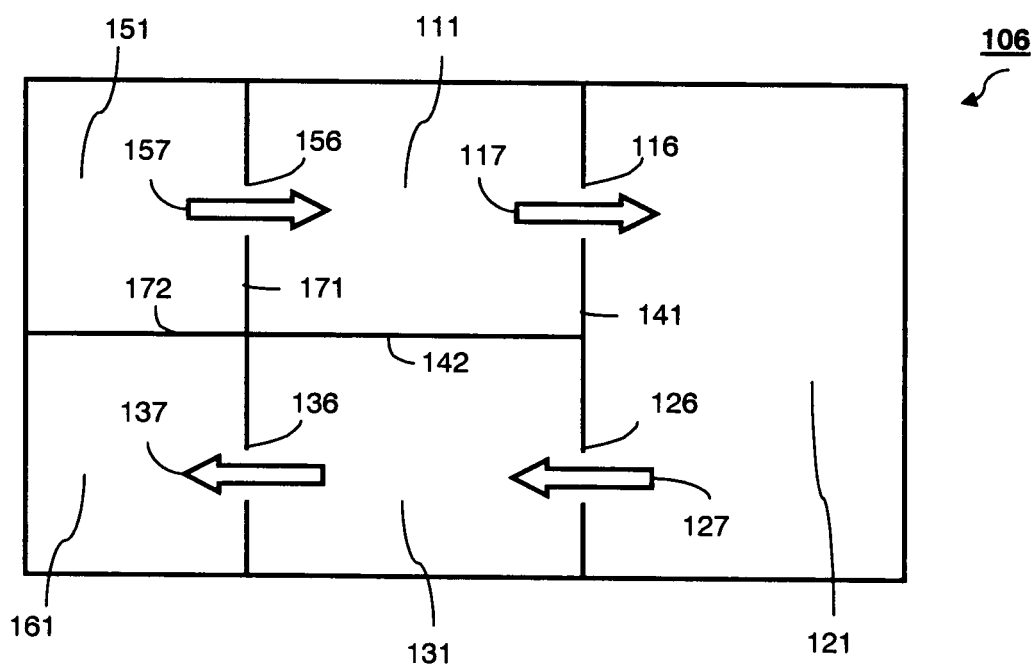
FIG. 1D is a schematic diagram of an extended exemplary cash processing centre configured to implement the second embodiment of the present invention.

FIG. 1D illustrates an example schematic of an extended cash processing centre 106 according to the second embodiment of the present invention. Extended cash processing centre 106 comprises deposit processing area 111, vault area 121, and order processing area 131, as present in the standard cash processing centre 105 of FIG. 1C, but also further comprises reception area 151 and despatch area 161. Reception area 151 may be separated from the deposit area 111 by physical boundary 171 as shown in FIG. 1D. If so, access to the deposit area 111 from the reception area 151 is provided by entry point 156, through which cash can be transferred as shown by arrow 157. Alternatively, the reception and deposit areas may be provided by a single area. Despatch area 161 may also be separated from order processing area 131 by physical boundary 171. If so, access to the despatch area 161 from the order processing area 131 is provided by exit point 136, through which cash can be transferred as shown by arrow 137.

Figure 1E:
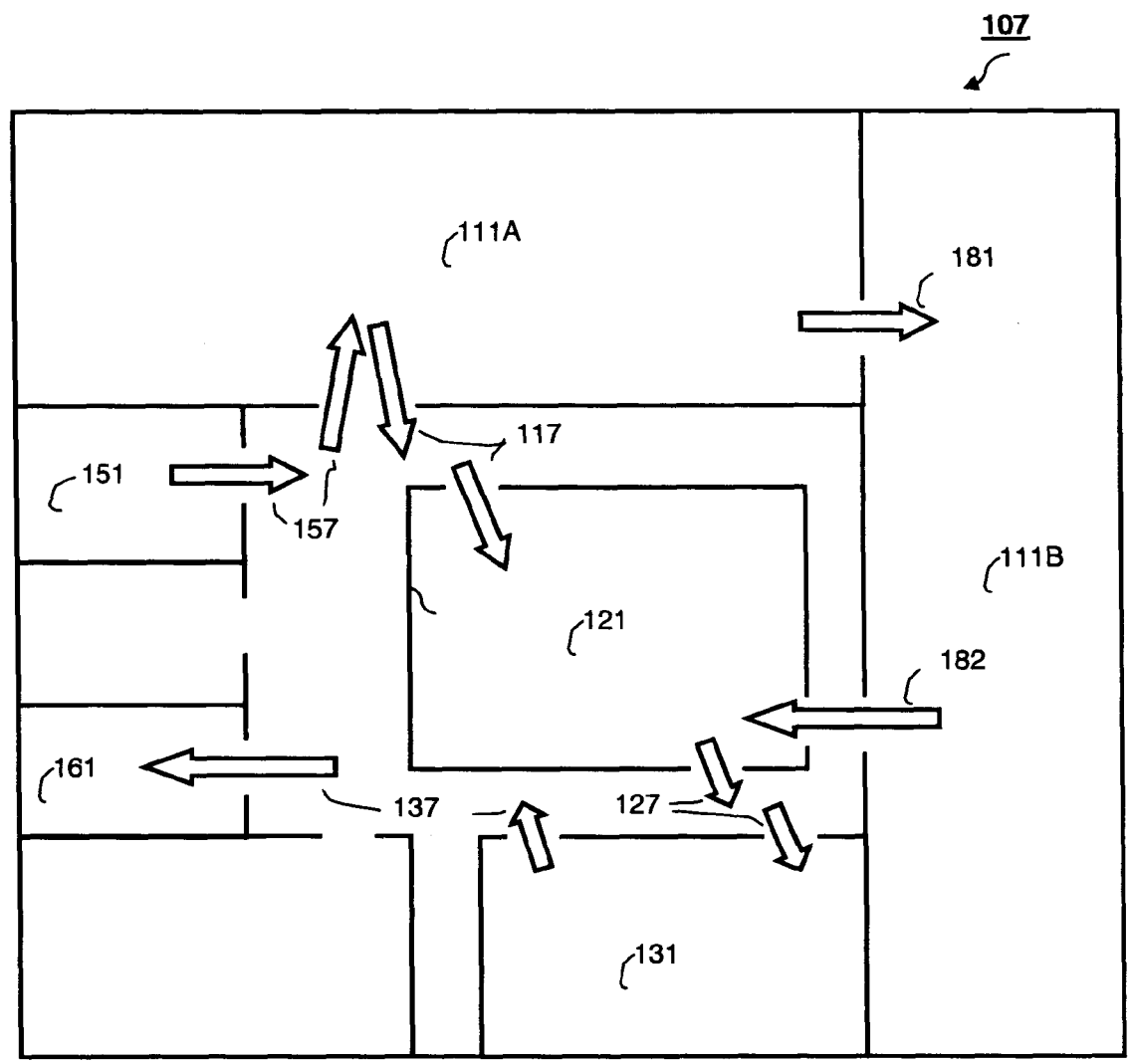
FIG. 1E is a schematic diagram of an alternative extended exemplary cash processing centre configured to implement the second embodiment of the present invention.

FIG. 1E shows an alternate layout for a cash processing centre, wherein features equivalent to those shown in FIGS. 1C and 1D are given identical reference numerals. Delivery bays 151 and 161 are used as reception and despatch areas, wherein delivery vehicles may reverse into said bays to load and unload cash deliveries. Deposit area 111 comprises two areas: area 111A comprising desk-top machines similar to workstation 220A and area 111B comprising large banknote sorters and a reject entry station. Selected deposits and rejected notes will pass from area 111A to area 111B through entry way 181. Vault 121 is located in the centre of the cash processing facility and receives cash from area 111A via route 117 and area 111B via route 182. Order processing area 131 receives cash from the vault 121 and picks orders to supply to the despatch area 161.

Cash reception 150 involves the receipt of containers that contain cash for deposit. Commonly, these containers are received from CIT operators which transport cash deposits from parties who are located at a distance from the cash processing centre. For example, at the end of a trading period, a bank may commission a CIT operator to pick-up cash from the bank's branch and transport it to the cash processing centre. During cash reception 150 the cash processing centre is responsible for unloading containers containing cash deposits from a CIT vehicle and documenting the newly acquired ownership of these containers. Responsibility for these containers can then be transferred to deposit processing 110. In a similar manner to the boundary line 140 in FIG. 1A, the extended cash management process 101 of FIG. 1B contains figurative boundary line 170. This separates the process of cash reception 150 from the process of deposit processing 110 and reflects the organisation of the discrete components of the vault management system.

Figure 4:
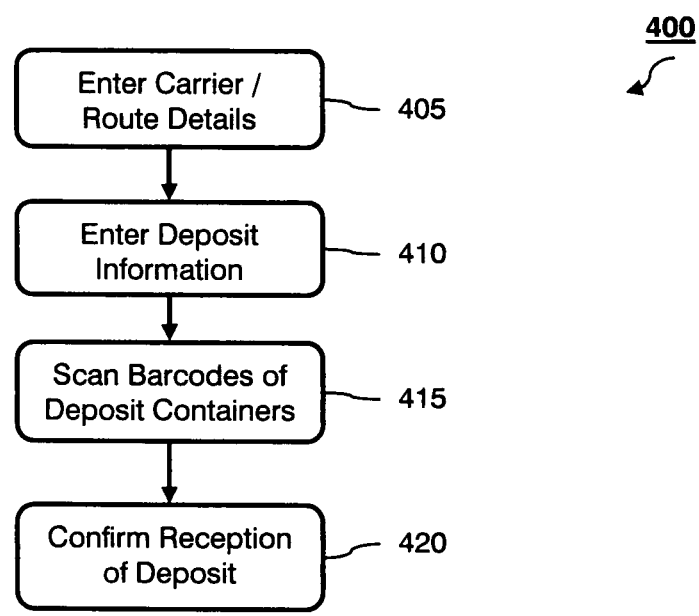
FIG. 4 is a flow chart demonstrating an exemplary cash reception process according to the second embodiment of the present invention.

An example of the cash reception process 150 is shown in FIG. 4. The method 400 shown in FIG. 4 is implemented when a cash deposit is received at the reception area 151. For example, the method may be initiated when a CIT vehicle arrives. As with deposit and order processing, the cash reception process is performed by an operator resident in reception area 151. The operator has access to an additional client workstation within the reception area 151. On arrival of a cash deposit, if an operator is not already logged in, the operator loads a cash reception module and logs into the system using their user name and password.

The operator then proceeds to capture data associated with the cash deposit. This begins with the step of entering the carrier or the route details 405 into the vault management system. Typically, this involves entering a carrier or route identifier from CIT or deposit documentation. This identifier can either be entered manually by the operator or automatically by scanning a barcode encoding the identifier.

At the next stage 410 deposit information related to the received cash is entered into the vault management system. This may comprise the number of containers being deposited or may comprise additional details such as the name of the depositing customer and/or the deposit amount. In a similar manner to the entry of the carrier or route details 405 the deposit information may be entered manually by the operator or may be retrieved from data encoded into the CIT or deposit documentation. At the next stage of the method the identifiers of the received containers containing the cash deposit are entered into the system. Typically, each container has an external barcode encoding the container identifier and this is scanned using a handheld barcode scanner in step 415. The cash reception module then stores the identifiers of each container and verifies that the number of containers present in the CIT or deposit documentation matches the number of identified containers.

Once all the received containers have been identified to the system then reception of the deposit is confirmed at step 420. This can be achieved by pressing an icon within a GUI used to implement the cash reception module. On receipt of a new cash deposit a number of new deposit records are created in the vault management database 215. Each container will have its own associated record which will contain information about its source, its contents and other processing information. When the reception of the cash deposit is confirmed at the confirmation stage 420 these records are permanently stored in the vault management software database 215 and the containers are assigned or allocated to the current operator and/or area. At this stage, "parent" containers containing one or more other containers may be unloaded or loaded to facilitate deposit processing. Before transfer to the deposit processing area 111 a reception operator is also able to re-load the reception module and edit any incorrect data.

Once a number of containers containing cash deposits have been received and documented in reception area 151 the containers are transferred to deposit processing area 111. Physically this is normally achieved using entry point 156. As well as physically transferring containers of cash between area 151 and 111 the reception operator must also complete a transfer process. As before, this transfer process is required to record the movement of the cash deposit containers. Hence the reception operator performs the steps of FIG. 3A whilst an operator in the deposit processing area 111 acknowledges the transfer, for example using the steps of FIG. 3B. Deposit processing can then begin as described with relation to FIGS. 5A and 5B.

The extended cash management process 101 of FIG. 1B also includes a despatch stage 160. After an order of cash has been processed by the order processing stage 130 it is typically sent to the despatch stage 160 to be despatched to the customer requiring the cash. The delivery is normally performed by a CIT operator. The despatch stage also records the transfer of responsibility from the cash processing centre to the party responsible for the delivery. The steps performed during cash despatch are shown in FIG. 7.

The result of the order processing stage 130 is a number of containers containing a quantity of cash to fulfil a cash order. Once an order has been prepared and processed it is transferred to the despatch area 161 to await despatch. Physically, this is often performed using a secure exit point 136. As part of the management process the one or more containers that contain the cash required for the cash order are also transferred to the despatch area 161 using a transfer process 135 as described previously with relation to FIGS. 3A and 3B. The transfer process is initiated by an operator within the order processing area 131 and a second operator logged into a client workstation within despatch area 161 acknowledges the transfer as well as physically receiving the containers.

Figure 7:
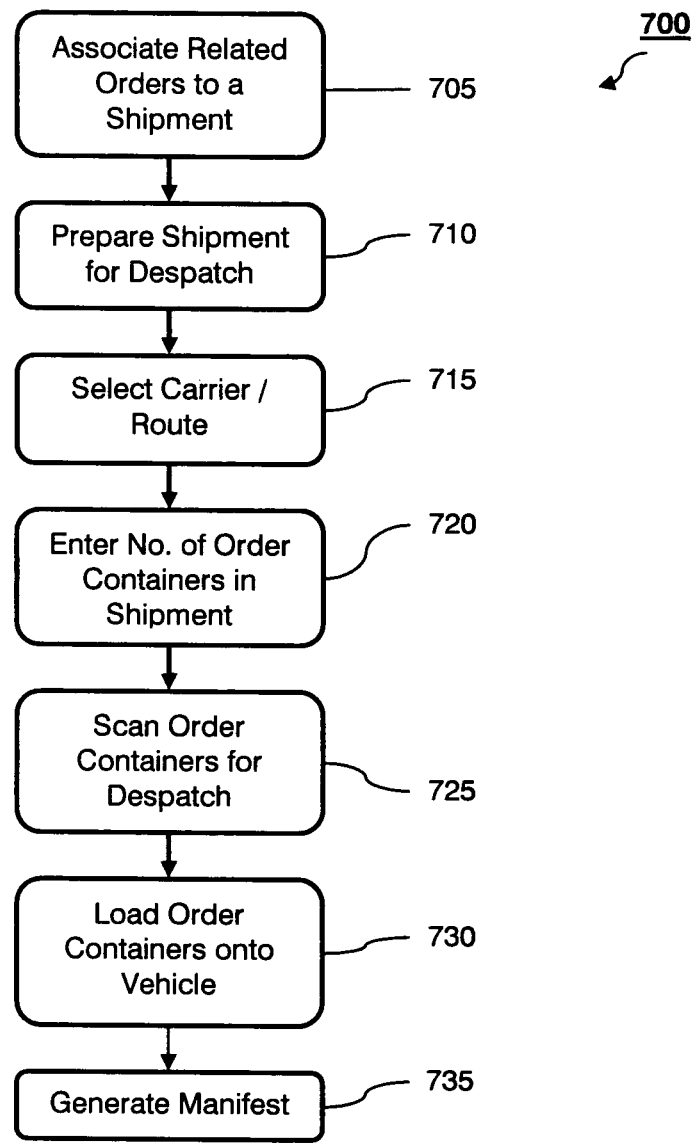
FIG. 7 is a flow chart demonstrating an exemplary cash despatch operation according to the second embodiment of the present invention.

Once in the despatch area 161 the operator may combine a number of cash orders into a shipment, as is shown in step 705 of FIG. 7. A shipment corresponds to a plurality of customer orders that will use a common despatch route or CIT operator. Alternatively, orders may be grouped into a shipment by management personnel or automatically based on scheduling considerations. In any case, when the despatch operator logs into the vault management system and loads a shipment module they are presented with a screen displaying all shipments scheduled for the present day. The shipment module may also display whether all containers for a given shipment are available for despatch or whether a shipment is incomplete or over-subscribed. Containers for a given shipment may be prepared in step 710 by physically grouping the shipment containers in a reserved section of the despatch area 161. Each shipment may have an associated printed manifest documenting the details of the shipment.

When the appropriate transport vehicle arrives at the cash processing centre the despatch operator begins the despatch process. The operator begins by loading the despatch module on a client workstation and selecting the route used by the waiting transport vehicle. The despatch operator then enters or selects the relevant shipments for that route and enters the number of containers to load onto the vehicle for each shipment at step 720. This may be achieved by scanning the barcode of a shipment manifest to retrieve a shipment identifier. The identifiers of all the containers to be despatched are entered into the despatch module which assigns these containers to the operator of the transport vehicle. This may be achieved by scanning container barcodes that encode a unique container serial number, as is set out in step 725. The identification of the containers making up the shipment transfers ownership of the containers from the despatch area 161 to transport vehicle operator. The order containers are then physically loaded onto the transport vehicle in step 730. A manifest related to the shipment and documenting the transferred containers may be generated in step 735. This manifest may be printed onto paper or may be stored electronically. The transport vehicle is then ready to depart the cash processing centre with the loaded containers.

Figure 8:
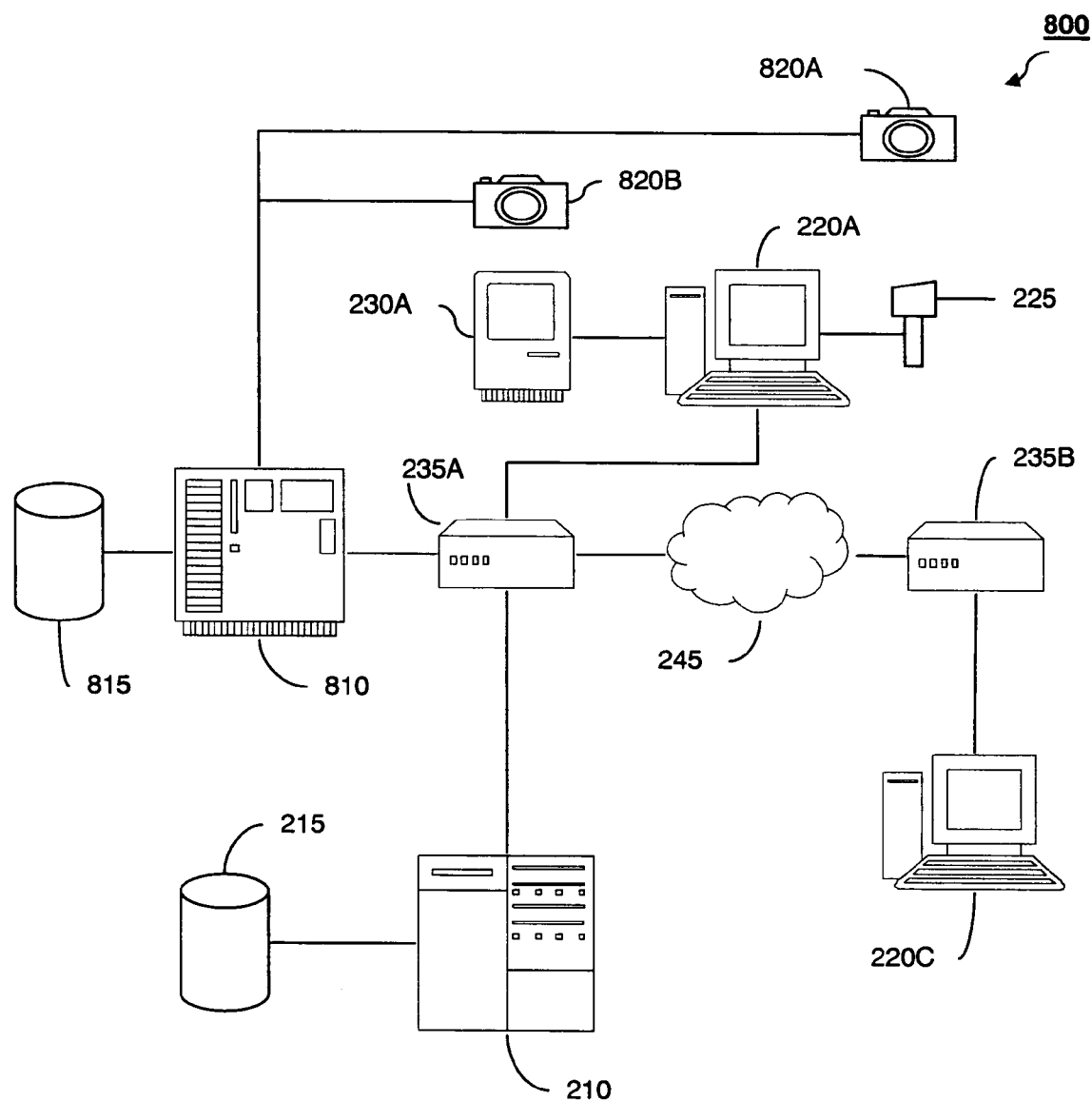
FIG. 8 is a diagram illustrating an exemplary hardware configuration of a third embodiment of the present invention.

A third embodiment of the present invention is shown in FIG. 8. This embodiment combines the vault management system of the first or second embodiment with a close circuit television (CCTV) system; the embodiment comprises the hardware components of FIG. 2A but then further comprises CCTV cameras 820 and a CCTV multiplexer and recorder 810. Typically cameras 820 are digital CCTV cameras and CCTV multiplexer and recorder 810 is adapted to store digitally recorded CCTV footage in database 815. Digital CCTV systems capture a video using high-capacity, high-speed multi-channel digital recorders. Such systems typically hold a vast amount of video footage and allow quick access to video files stored in database 815.

Using the assignment of containers and assets, together with the transfer process, the vault management system of the first and second embodiments is able to capture data related to all cash processing actions in its database. Each recorded action, for example a transfer, count or reception operation, will have an associated date, time and location. In a similar manner the CCTV system will monitor set locations and will index each video recording using a date and a time. Hence, as both the vault management system and the CCTV system are commonly linked by location, date and time parameters it is possible to retrieve video footage from database 815 based on a location, date and time specified by the vault management server 210.

For example, a supervisor may wish to view the transfer of a set of containers between the order processing area 131 and the despatch area 161. Such a transfer will have an associated transfer record in the vault management database 215. This transfer record will then comprise data specifying an associated set of locations (areas 131, 136 and 161) and an associated date and time. The vault management server 210 is then adapted to supply these parameters to the CCTV multiplex and recorder 810 which is able to retrieve the appropriate video from video database 815. The supervisor is then able to view the video footage for that location, date and time.

As well as integrating the vault management data with a CCTV system other supervisor functions may also be optionally integrated to facilitate management of the cash processing centre. The supervisor functions described herein may be used with any embodiment of the present invention. The interfaces for these supervisor functions can be viewed using a remote client workstation such as workstation 220C. The first of these modules is an investigation and research module. This provides a front-end to the vault management database enabling the supervisor to query and view all deposit transactions, all transfer processes and all inventories across any networked cash processing centres, including user and/or area inventories. Each query or inventory may also be printed as an electronic or paper report. Reports include, amongst others, operator productivity, discrepancy pattern analysis, deposit quality per depositor, counterfeit frequency per depositor or ATM fit note yield per depositor. Discrepancies reported by customers can be investigated by recalling all data associated with the deposit and/or cash order in question, including the image of the deposit slip. Discrepancy reports can then be generated and printed or sent electronically. In some configurations it is also possible to provide keystroke and/or device logging that can provide an extra level of information for audits or investigations.

A supervisor may also be provided with a stock balancing function that can be used to balance stock at the end of a working day or shift. The exact time or event that triggers a balance procedure is configurable. An operator first uses the system and logs into the balance module. They then select their name from a list onscreen and are presented with a list of the stock that is currently assigned to them. The operator then performs a count of the cash within their work area and enters the count result into the module. This process may also be performed without displaying the expected stock to perform the balancing "blind". If a difference is found between the expected and actual stock count the module will prompt the operator to perform a recount. If after the recount an imbalance still remains a supervisor is summoned. The supervisor is then able to adjust the balance if need be or investigate any discrepancy.

The ownership, count, sort, inventory, reclassification and order processing data can be used together with other relevant collected data to provide a real time summary of key performance indicators. These may be displayed visually to a supervisor or an operator. Any known data processing used in the art may be applied to the data to provide appropriate management information to a wide variety of personnel, from senior management to low-level operators.

A fourth embodiment of the present invention is illustrated in FIGS. 2B, and 9 to 11. This embodiment provides an alternative method for performing deposit processing 110 that is adapted to handle large quantities of cash.

Figure 2B:
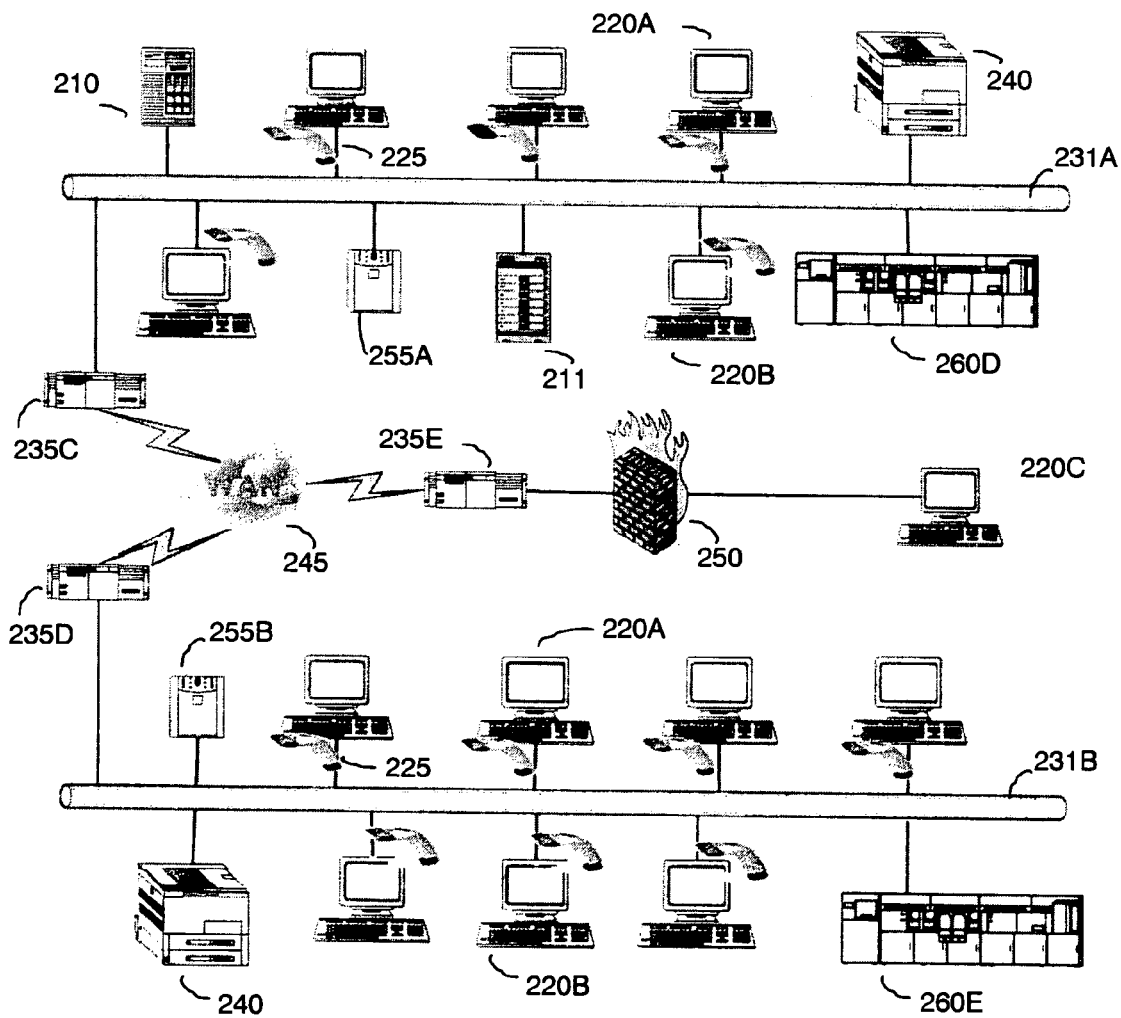
FIG. 2B is a diagram illustrating an exemplary hardware configuration to implement the fourth embodiment of the present invention.

FIG. 2B illustrates a suite of exemplary hardware components that may be used to implement the fourth embodiment of the present invention. Such hardware as described below may also be used to implement any of the other embodiments of the present invention described herein. FIG. 2B shows two networks 231A and 231B that communicate with each other and a remote client workstation 220C using WAN 245. Each network 231A and 231B is connected to a respective router 235C and 235D which then provides the gateway to the WAN. Remote client workstation 220C is connected to a third router 235E via firewall 250. Each network 231A and 231B may correspond to two different areas of a cash processing centre, for example deposit area 111 and order processing area 131, or to two physically separate cash processing centres belonging to a single organisation.

Figure 11:
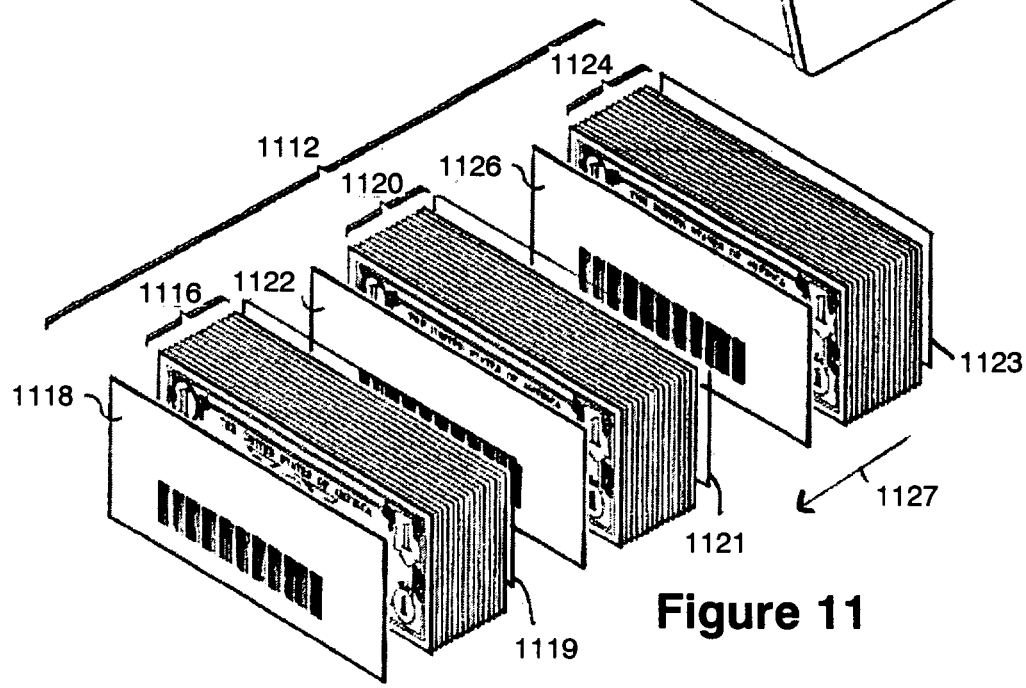
FIG. 11 is a diagram illustrating a typical stack of banknotes used in the exemplary deposit processing operation of FIG. 9.

Top network 231A is connected to vault management server 210 and mirror or RAID (Redundant Array of Independent Disks) server 211 which together run the server operations of the vault management software and include a vault management database (not shown). Lower network 231B interfaces with vault management server 210 via the WAN 245. Both networks further comprise uninterruptible power supplies (UPS) 255A and 255B, reports printers 240, client workstations 220A and connected handheld barcode scanners 225 and currency sorting machines 260D and 260E. An exemplary currency sorting machine 260 is illustrated in FIG. 11. The machine 260 comprises document feed area 1012 and document output hoppers 1014. The document output hoppers further comprise reject hopper 1014R. While the fourth embodiment is described with regard to the hardware configuration of FIG. 2B it is not limited to such a configuration and can be used with any other suitable configuration including that of FIG. 2A. In the latter case banknote counter 230A is replaced by currency sorting machine 260.

Multiple cash processing centres may record data such as ownership transfers, count data and inventory information on a single central database server. This central database server may comprise a primary and back-up server and be accessible from each cash processing centre over a WAN. The database server may also be accessible from a central administrative head-quarters or office. The database server may also provide some or all of the functionality of vault management server 210 and may be connected to a network resembling network 231A but without the cash processing centre workstations 220 and banknote counters 260. Standard firewall technology can be implemented so that networked machines within a cash processing centre can only see data upon the database server that relates to the centre in question. However, administrative machines may be able to access, view and aggregate data from a plurality of cash processing sites.

Figure 5B:
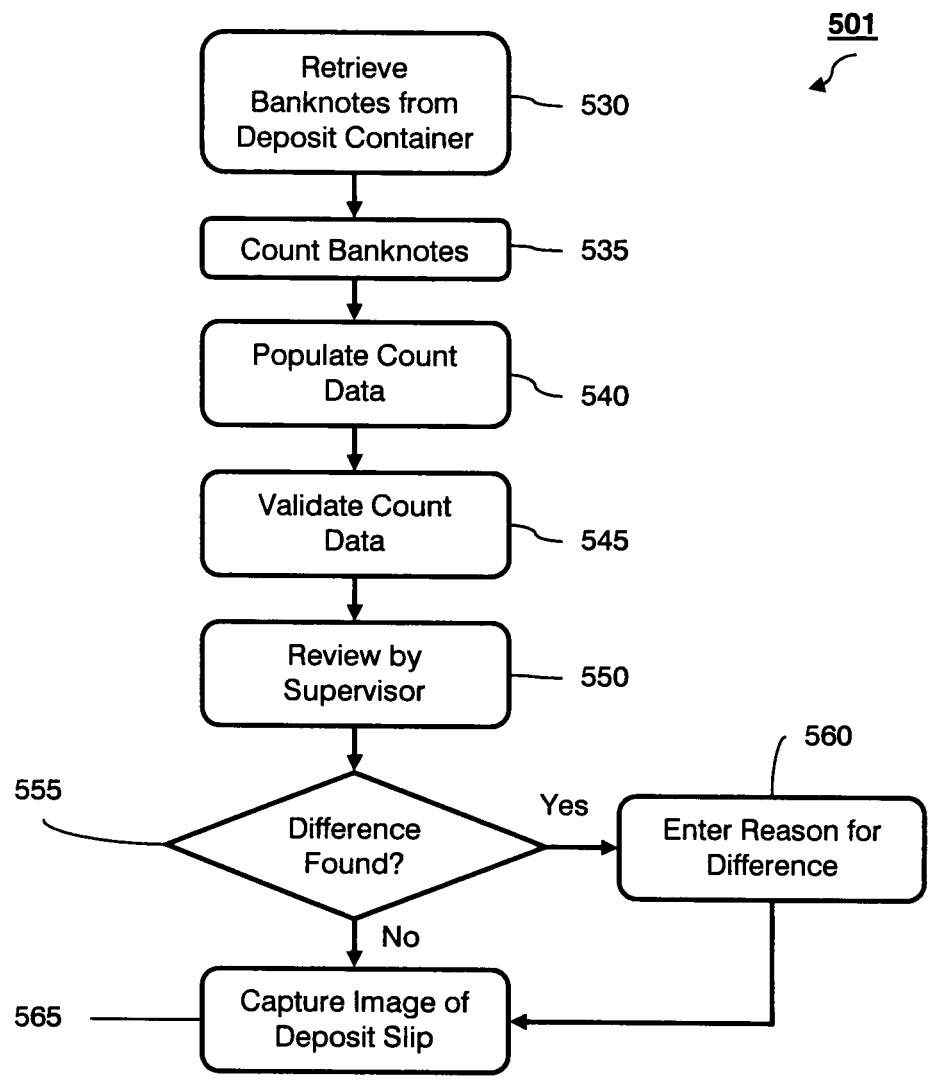
FIG. 5B is a flow chart demonstrating an exemplary count operation according to a first embodiment of the present invention.
Figure 9:
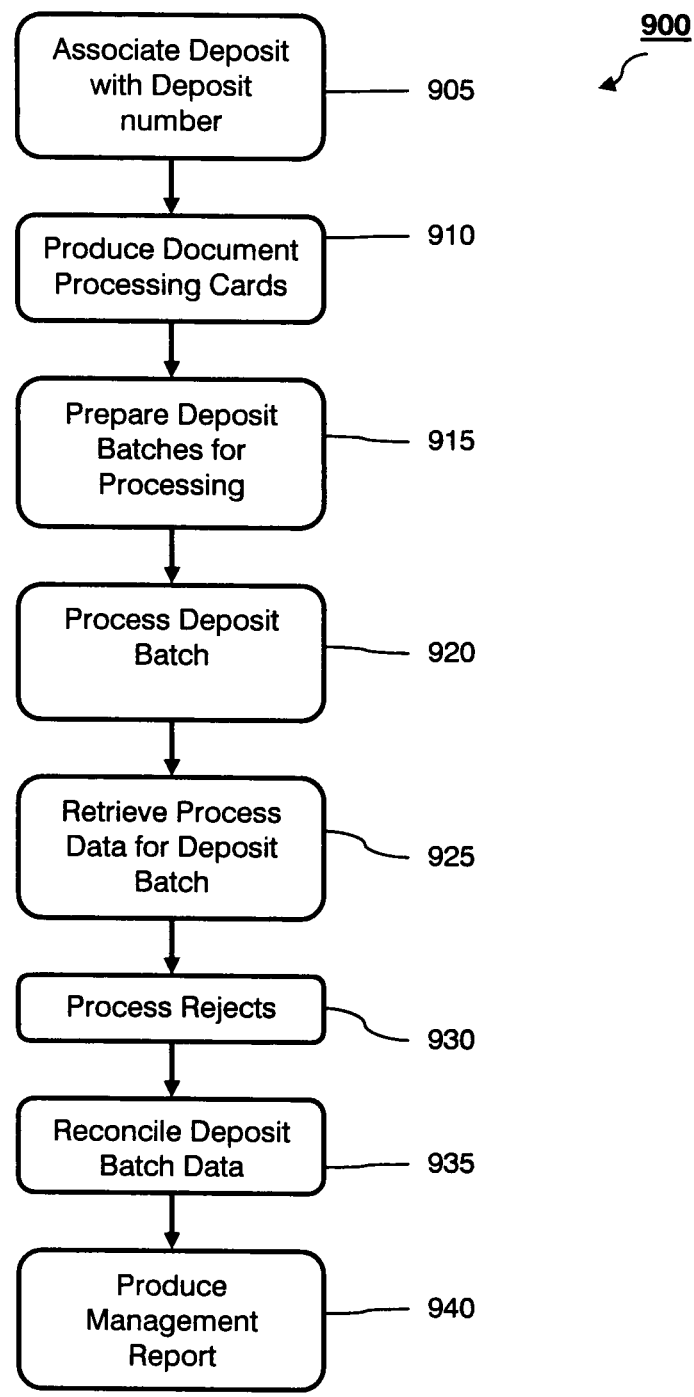
FIG. 9 is a flow chart demonstrating an exemplary deposit processing operation according to a fourth embodiment of the present invention.
Figure 10:
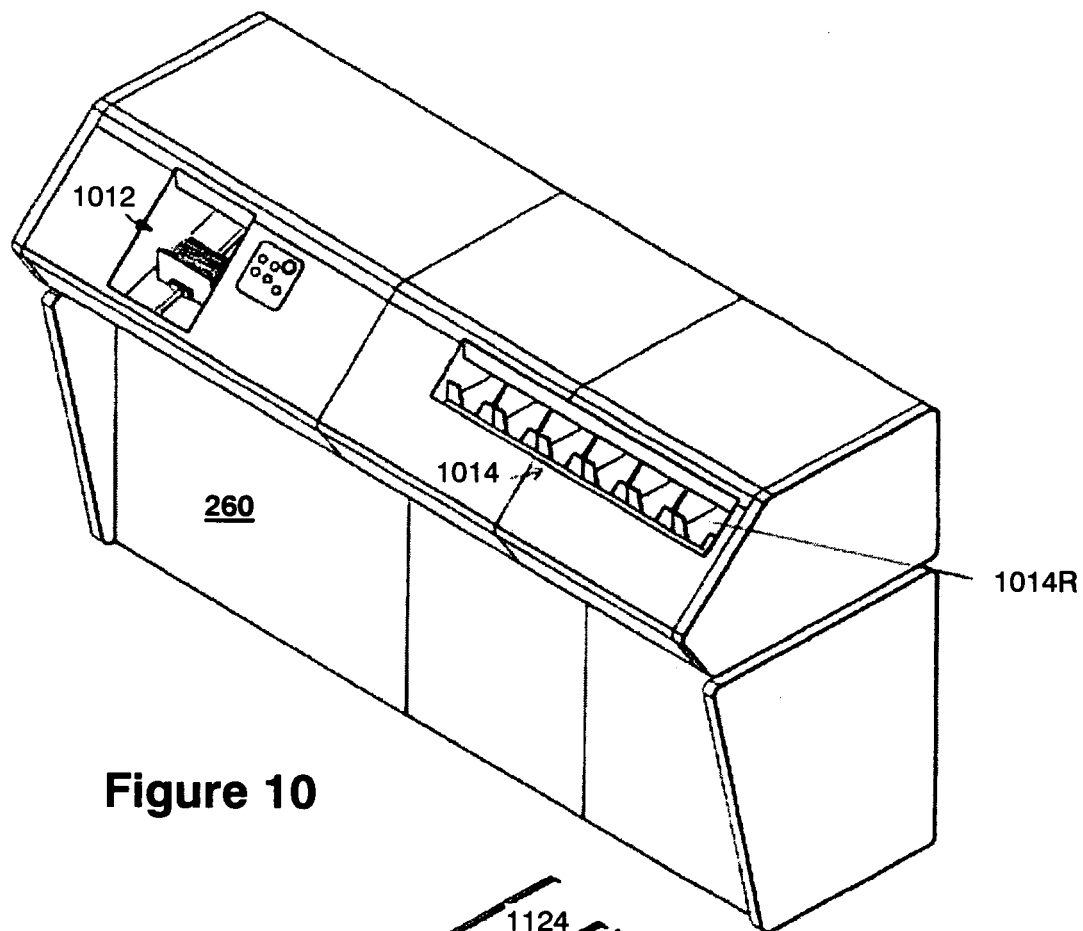
FIG. 10 is a diagram illustrating an exemplary currency sorting machine for implementing the exemplary deposit processing operation of FIG. 9.

The method of the fourth embodiment illustrated in FIG. 9 provides an alternate method for performing deposit processing as illustrated in FIGS. 5A and 5B. In the first and second embodiments each deposit is commenced, counted, validated and completed prior to moving onto the next deposit. The cash pertaining to such a deposit typically remains with a deposit operator at all times. In the fourth embodiment a plurality of deposits are batched together and processed in a continuous cycle away from the desk of an operator.

The method of deposit processing according to the fourth embodiment involves three main stages: preparation; note sorting and deposit counting; and reject entry. Reject entry comprises capturing data related to notes that were rejected within the sort process. Such notes may be damaged or counterfeit.

The method 900 of FIG. 9 commences after an operator within the deposit processing area 111 receives one or more containers containing a cash deposit. The operator performs the steps of FIG. 5A as per the first embodiment but at step 520, when the deposit record is updated, the deposit is assigned a unique deposit identifier as shown in step 905. This deposit identifier allows the deposit to be tracked for the duration of the deposit processing. For large deposits the deposit may be split into a plurality of smaller deposits which will each be assigned a unique deposit identifier. Once the deposit identifier has been assigned a set of two separator documents are generated at step 910. The deposit is then arranged in a deposit batch in step 915.

A series of three deposits and their associated separator documents 1112 that make up an exemplary deposit batch are shown in FIG. 11. The separator documents are designed to be placed around a bundle of banknotes 1116, 1120, 1124 making up the deposit and comprise a "first" or downstream document, 1119, 1121 and 1123, and a "second" or upstream document, 1118, 1122 and 1126, wherein the banknotes are configured to be fed in the direction of arrow 1127. The first separator documents 1119, 1121 and 1123 act as a trailer and the second separator documents 1118, 1122 and 1126, act as a header. Each header document comprises one or more magnetic strips on the rear (downstream) side of the document and a barcode on the front (upstream) side of the document. The unique deposit identifier is typically encoded in both the barcode and the magnetic strip.

Alternatively, the separator documents may be taken from a stock of pre-existing separator documents. In this case, each the barcode and magnetic strip(s) encode an arbitrary serial number. This serial number is then assigned to a deposit at step 905 by scanning the barcode on each header document whilst putting together the deposit batches.

Each deposit batch is commonly arranged on a deposit tray that is adapted to feed a currency sorting machine 260. A deposit batch may contain a plurality of deposits from difference customers. Once a deposit tray is full, or a deposit batch reaches a predefined size, it is taken by an operator to the currency sorting machine 260 for processing and counting at step 920. The deposit batches, complete with separator documents, are placed onto a feed mechanism of the currency sorting machine 260 at feed area 1012 and the machine continuously feeds the note into a note processing area. The processing performed by the currency sorting machine 260 incorporates one or more of counting, authentication, fitness and denominational sorting in a single process run and typically provides all four forms of processing. During the sort process detectors within the machine inspect both the banknotes and separator documents. When the machine encounters a header document it reads the unique identifier on the document encoded in either the magnetic strips or the barcode. This identifier is then associated with the sort or process records of the subsequent banknotes. When the trailer separation document is then subsequently detected the machine then disassociates the unique identifier from the sort or process records of subsequent banknotes.

Sorted banknotes are provided to output hoppers 1014 depending on the sort process. For example, a detector may be provided for determining the denomination of each banknote and another detector for determining authenticity. If a banknote is found to be authentic and its denomination can be determined, it will be directed to a particular output hopper for stacking genuine banknotes with that denomination. All other documents either non-genuine or unreadable banknotes or separators are fed to the reject hopper 1014R.

The processing data associated with a deposit amount originally situated between the separator documents is sent by the currency sorting machine 260 via network 231A to vault management server 210. The server then populates the deposit count and processing data at step 925 using the unique deposit identifier as an index.

Reject banknotes fed to the reject hopper 1014R remain sandwiched between their associated separator documents and form reject deposit batches. These reject deposit batches are then taken to a reject processing station wherein the reject notes are processed a second time at stage 930 to ascertain the reason for rejection and/or possible detect good notes that were not detected on the first pass (for example if they were rejected as overlapping or misfed notes). The reject data is also associated with the unique identifier on the header document and is sent to the vault management server to update the deposit count and processing data. Alternatively, the reject notes can be manually inspected by an operator. In this case the operator will manually scan the barcode on the associated header document and enter the reject data.

Once process data for all the banknotes within the deposit has been ascertained then this data is automatically reconciled with data obtained from the deposit slip at step 935. As with the first embodiment any discrepancies are flagged to a supervisor in a management report produced at step 940.

The benefits of the fourth embodiment are numerous. The deposit processing is performed in one continuous process and a high level of accuracy, integrity and security is maintained. Added security can be provided by performing the processing "blind", i.e. the operator responsible for operating the counter and/or entering reject information is unaware of the depositor details.

Figure 12:
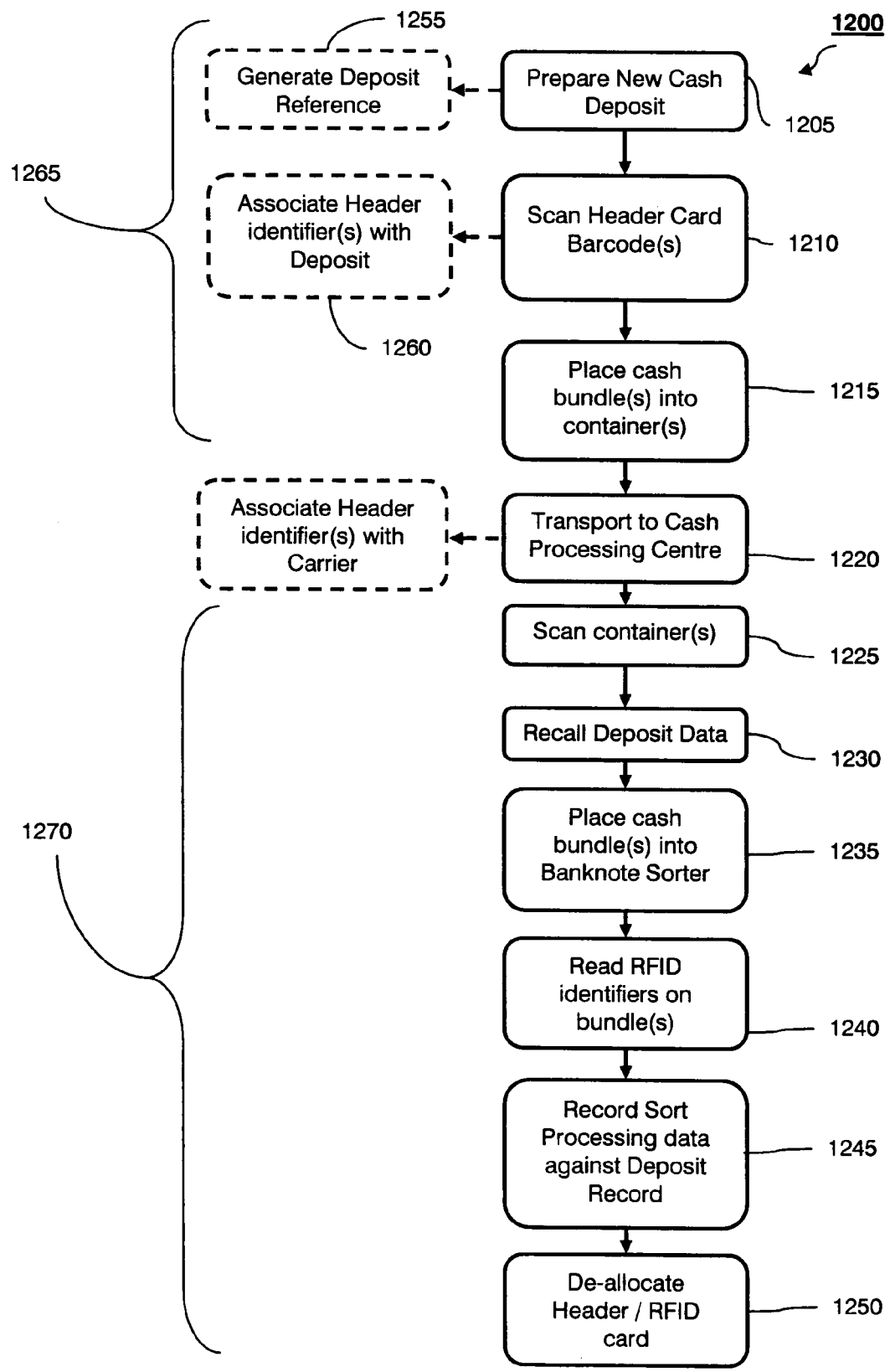
FIG. 12 is a flow chart demonstrating an exemplary deposit processing operation according to a fifth embodiment of the present invention.

A fifth embodiment of the present invention is illustrated in the flowchart of FIG. 12. This embodiment incorporates customer processing of cash deposits before said deposits are delivered to the cash processing centre, commonly referred to as "pre-advisement", and uses radio frequency identification (RFID) devices in order to facilitate data management during the cash deposit process. Reference to a customer refers to a customer of the cash processing centre.

In the flowchart of FIG. 12, steps 1265 are performed by the customer or organization making a deposit. As such, these steps may be performed upon the customer's premises or within their place of business, for example within a back office in a retail environment. At step 1205, the customer prepares a new cash deposit. This deposit will typically comprise a quantity of cash, cheques and/or documents of value that the customer wishes to deposit at the cash processing centre. The length and complexity of this step will depend upon the size and nature of the customer and/or organization. For example, in a large retail organization, a customer may move their till takings from the front of the shop to the back office after closing, wherein the takings will be counted and sorted to produce a deposit for that day of trade. During the preparation of this deposit a deposit reference is typically generated at step 1255 which allows the customer, and subsequently the cash processing centre, to identify the deposit. In certain embodiments the deposit reference may be an alpha-numeric code. The deposit reference may be generated automatically at the end of trade or may be actively generated by the customer upon preparing a new cash deposit. For example, a user may select a new deposit action from a user interface present upon deposit management software running on a computer terminal in the retailer's back office.

The customer will then prepare the cash and/or articles of value for deposit. This typically comprises sorting the articles for deposit into bundles of banknotes of a certain cash value or of a number of banknotes of a set denomination. This sorting may be performed in conjunction with a banknote sorter present upon the retailer's premises. For each bundle deposit generated by the retailer, the customer attaches one or more separator documents. These separator documents may comprise the header and trailer cards 1118 and 1119 shown in FIG. 11. Two of these separator documents are placed around the bundle: a header card 1118 on the top of the bundle and a trailer card 1119 on the bottom of the bundle. These separator documents may comprise plastic cards for durability, and be designed to be hard-wearing.

In the present case, the header card 1119, forming part of the separator documents attached to a bundle of banknotes, comprises a barcode and an RFID or wireless electronic chip. As each bundle is formed, such as bundles 1116, 1120 or 1124 in FIG. 11, the retailer will scan the barcode present on the header card associated with each bundle. This barcode will typically encode an identifying serial number or alpha-numeric code. This number or code is then associated with the deposit reference calculated in step 1255 and step 1260. The RFID chip typically comprises an integrated circuit and an antenna and may be similar to the chip shown in FIG. 14 and described in the section "RFID Tracking". The antenna is used for receiving and transmitting a wireless or radio frequency signal and the integrated circuit is typically used for storing an identifying serial number or alpha-numeric code and for modulating and demodulating the wireless radio frequency signal. On supply to the customer the RFID chip is set to typically read-only. In a variation of step 1210, the customer may alternatively prepare the bundle and then instead of scanning the header barcode, pass the bundle under a RFID reader which will communicate with the RFID chip and retrieve the identifying serial number stored in the chip. This number is then associated with the deposit at step 1260. The association is typically performed by storing the retrieved serial number and the deposit reference in a central database. This central database may be coupled to a web server accessible by both the customer and the cash processing centre over a WAN or may be database 215. Alternatively, the association may be stored in a local database at the customer's premises and then sent to the cash processing centre by electronic communication. In certain embodiments, both the barcode serial number and the RFID serial number may be stored with the deposit reference. The RFID chip may also be located in a different separator document to that which contains the barcode.

During the preparation of the cash deposit at step 1205, the customer will generate deposit information relating to each bundle. For example, this may be at least one of: date and time of processing, personnel present, location of processing, count information, the total value of the bundle, the number of notes of a particular denomination, authenticity information related to the notes within the bundle and fitness information such as the level of soil or tears. This deposit data may either be produced by hand, based on a manual count and individual inspection of each note within the bundle, or may be produced automatically using a banknote sorter. If the information is produced by hand it may be recorded against the bundle RFID and/or barcode reference using a user interface displayed on a customer computer terminal. If the information is produced by the banknote counter it may be passed in electronic form to the customer's computer for storage against the bundle RFID and/or barcode reference (and thus in turn the deposit reference) or may be displayed to the customer for manual entry against the bundle reference using a user interface. This allows a running total of the current deposit to be calculated after processing each bundle.

The banknote sorter may be further adapted to take a plurality of banknotes and/or articles of value as input and produce a number of banknote bundles with pre-determined properties as output. For example, the banknote sorter may automatically produce bundles of one hundred notes of each denomination, for example one hundred notes of 10 dollar or 10 euro value and then automatically place a header and trailer card around the bundle before the bundle is output to a sorter output tray or stack. The banknote sorter can then be adapted to read either the barcode or the RFID chip serial number as the bundle is put together to automatically associate the separator card or chip identifier with the processing details of the banknote bundle.

At step 1215, the produced cash bundles are placed into one or more containers ready for transportation to the cash processing centre. Each container may optionally also comprise a barcode and/or RFID chip, in which case a serial number or alpha-numeric code contained within the barcode and/or RFID chip may be read and associated with the deposit and bundle references. The container is preferably made form a non-conductive material to facilitate the reading of RFID chips inside the container. This then marks the end of processing at the customer end of the process flow.

At step 1220, the one or more containers containing the cash bundles are transported to the cash processing centre. This step is typically performed by a carrier operator who collects the one or more containers from the customer and delivers them to the cash processing centre. In the present example, the carrier operator is equipped to scan each container with an RFID reader. This allows the bundle identifiers associated with RFID chips attached to each bundle to be read inside the container. These identifiers can then be associated with the carrier and/or route details such as the present driver or security personnel, the time and date of collection, and other relevant information. The bundle identifiers may be associated with the carrier and/or route details in a database record and stored locally in a storage device present within the carrier vehicle. These records may then be downloaded upon arrival at the cash processing centre. Alternatively, each vehicle or carrier operator may be provided with a wireless or mobile data entry device, such as a PDA or mobile phone. This device may also comprise the RFID reader and a barcode reader and thus the header and container identifiers read from the container may be transmitted wirelessly to a central server wherein the deposit records can be updated accordingly. If these carrier details are linked with the header identifiers then they may be retrieved from the central database using the identifiers as an input to a query at step 1225 when the containers are scanned on arrival in the reception area 151.

Once the one or more containers reach the cash processing centre, steps 1270 are performed within the centre. The present example will be described in relation to a cash processing centre such as that described in the second embodiment. However, it is also possible to use a cash processing centre as described with relation to the first embodiment. Hence, when the one or more containers containing the bundles of banknotes arrive at the cash processing centre, they enter into the reception area 151 wherein reception processing 150 begins. However, in contrast to the reception processing 150 of the second embodiment, the use of RFID chips associated with each cash bundle greatly simplifies the steps that need to be performed by the operator in the reception stage. Instead of entering deposit details into a user interface, the operator in the reception area 151 simply scans each container at step 1225 with a RFID reader to obtain the serial numbers of all the cash bundles present within the scanned container. Alternatively, this scanning may be performed automatically by a scanning gate at the entrance to the reception area 151. These serial numbers are then processed by the reception module of the vault management system. This processing typically involves using the serial numbers in a database query to retrieve the deposit records generated at steps 1205 and 1255 within the retailer's premises. For example, the reception module may access a central server or database wherein the deposit and processing information related to each bundle identifier is stored. Once the deposit reference associated with the one or more cash bundles is retrieved, data related to that deposit, such as the customer name and address, total value of the deposit or any other preadvised data that was entered at the customer's premises, may be displayed onscreen for visual verification by the operator in the reception area 151. The reception processing 150 may also involve verifying that all the RFID serial numbers associated with bundles placed in each container by the customer are also detected on the scan performed by the operator. If one or more RFID serial numbers are not detected, or alternatively one or more RFID serial numbers not associated with the customer's deposit are detected, then this is recorded and a warning may be flagged to the operator or their supervisor. If the RFID serial numbers match, the one or more containers and/or the RFID and/or barcode serial numbers associated with each cash bundle within each container are assigned to the current operator and/or area. If a scanning gate is provided at the entrance to the reception area, the carrier vehicle or containers from the vehicle may be scanned on entry to the reception area 151 to check for the presence of RFID chips. The serial numbers read back from located RFID chips may then be reconciled with the data recorded by the carrier operator.

As in the second embodiment, after the containers have been scanned in the reception area 151, the cash bundles are transferred to the deposit processing area 111 wherein deposit processing 110 is performed. Typically, deposit processing 110 is performed in a similar manner to that described in the fourth embodiment, however, the various steps described herein may also be performed manually in association with the deposit processing described in relation to the first embodiment. The transfer of ownership to the deposit area and/or deposit operator may involve logging the transfer of the bundle identifiers to keep track of all bundles of cash.

At step 1235 the cash bundles are removed from the one or more containers and prepared for processing by a banknote sorter. In contrast to the fourth embodiment, the cash to be counted and processed is already provided in bundles with separator documents and therefore these cash bundles may be simply retrieved from the one or more containers and placed on a deposit tray ready for feeding to a currency sorting machine 260. The currency sorting machine 260 is typically adapted to either read the barcode serial numbers present on one of the separator documents or the RFID serial number on each cash bundle at step 1240 and thus is able to look up the deposit identifiers related to the bundle identifiers and then record processing data generated by the currency sorting machine 260 against the deposit record. For example, as in the fourth embodiment, the currency sorting machine may incorporate one or more of counting authentication, fitness and denomination sorting. Information related to one or more of these areas may be stored under the deposit reference that is linked to the presently processed cash using the bundle identifier. This is shown in step 1245.

This then allows the sort information associated with each bundle that was recorded at the customer's premises to be reconciled with the sort information generated by the currency sorting machine 260. Any errors, irregularities or discrepancies may then be reported to senior personnel and recorded against the deposit. For example, the counted value of each bundle, as calculated by the currency sorting machine 260, may be compared with the value of each bundle as entered or calculated during deposit processing at the customer's premises. In one example, if the serial numbers of each banknote in a given bundle were recorded during deposit processing at steps 1265 then these could be checked against the serial numbers of each banknote as recorded by the currency sorting machine 260. After processing by the currency sorting machine 260, the separator documents are removed from the bundles as the cash is typically resorted and recombined with other deposits for ease of deposit into the vault 121. In this case, the separator documents are sent to a reject pocket such as 1014R in FIG. 10, which involves deallocating the serial numbers of the separator documents from the deposit at step 1250 so the same separator documents may be reused for other deposits. For example, the separator documents can be recollected and resent to the customer for future deposits. Several variations of the fifth embodiment may be applied without deviating from the scope of the present invention. Instead of bundling the cash to be deposited, a durable plastic tag containing an RFID chip may be included in the deposit container together with the cash to be deposited. A serial number associated with the tag is associated with the deposit by either scanning the tag with an RFID reader, scanning a barcode printed on the tag or manually entering a serial number printed on the tag. Deposit information produced by the customer is then associated with the serial number of the tag. On arrival at the cash processing this tag may be read and processed in a similar manner to the separator documents described previously. The tag may be also scanned by the carrier operator during delivery.

If the security of the deposit is monitored from the time of customer deposit processing to deposit in the vault 121 then the methods of the fifth embodiment may be used to enable the value of the deposit to be added to the customer's financial account at the date and time of customer deposit processing, i.e. enable customers to pass value at source.

A further variation of the fifth embodiment uses RFID devices with a quantity of writeable memory. The customer is equipped with a RFID writer that enables the previously discussed deposit and/or processing data related to each banknote bundle and/or total cash deposit to be written to a memory within an RFID device associated with the bundle and/or deposit. Hence, instead of retrieving deposit and/or processing data using the serial numbers of the RFID chips, such data may be read directly from the memory of the chip itself.

Figure 13:
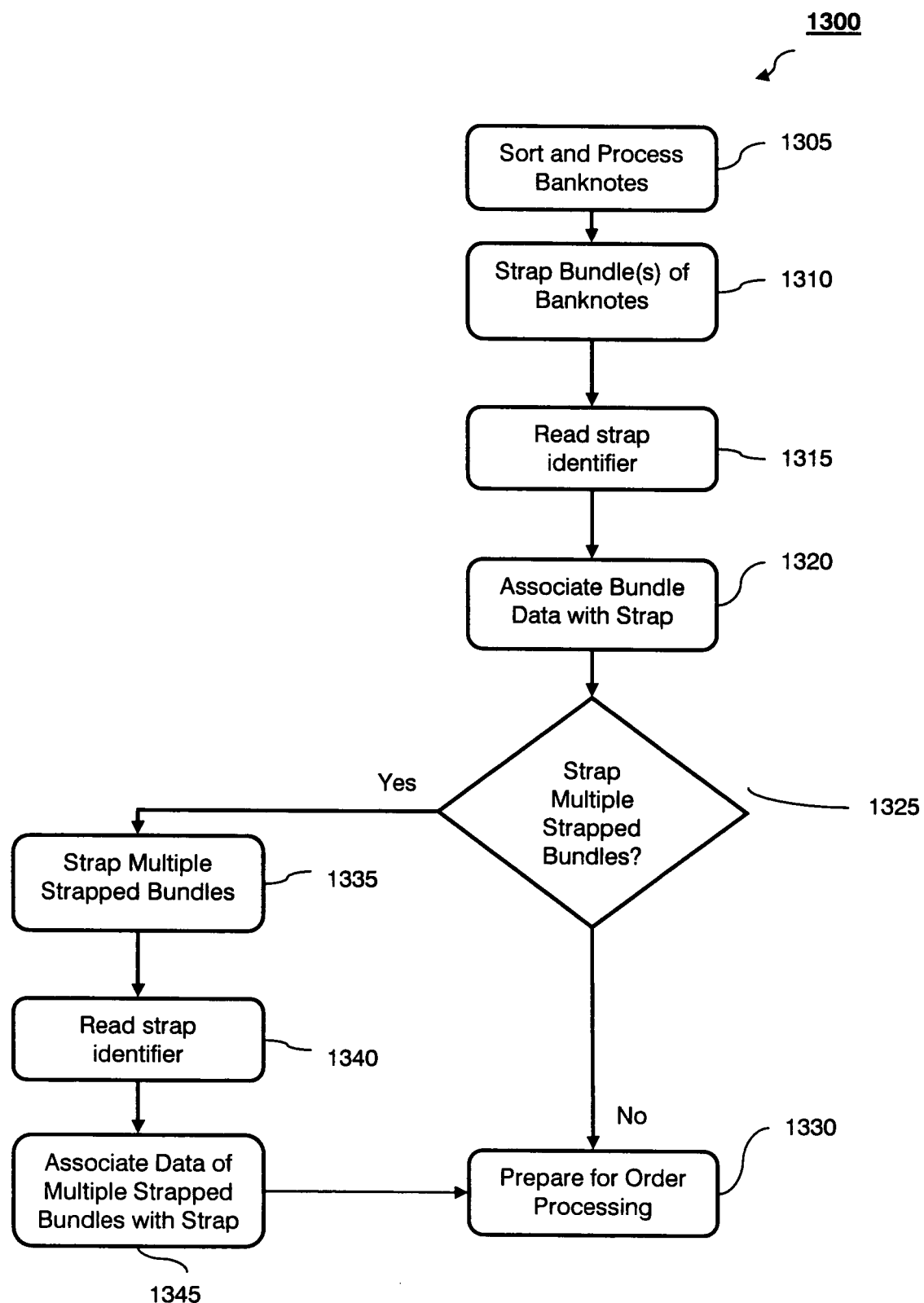
FIG. 13 is a flow chart demonstrating an exemplary processing operation according to a sixth embodiment of the present invention.

A sixth embodiment of the present invention is illustrated in the flowchart of FIG. 13. This embodiment uses radio frequency identified (RFID) devices in order to simplify the order preparation process by allowing the bulk scanning of outgoing customer orders to verify their contents.

One set of processing which is performed during vault processing 120 is the re-bundling of sets of banknotes in bundles of a predetermined denomination and optionally of a particular fitness. Each bundle is then secured with one or more plastic straps. The strapping process may also be performed by a strapping machine that is adapted to sort and process the banknotes before automatically applying straps to any sorted bundles.

In the present case, RFID devices or tags are embedded or attached to the banknote straps that secure each bundle and this RFID tag is used to identify the bundle and optionally to store data related to the notes within the bundle. Each RFID device may resemble that shown and described in relation to FIG. 14. The method of FIG. 13 shows a suitable strapping process. At step 1305, a quantity of banknotes are sorted and processed. This may involve a manual sort or may involve a sort by a banknote sorter or strapping machine. Examples of sort criteria are denomination, currency, fitness, issue, or banknote recycling framework (BRF) type. The output of this sorting process is typically a bundle of banknotes with predetermined properties, for example 100×10 euro banknotes. At step 1310, a strap is applied to the sorted bundle of banknotes to secure the bundle. This strapping process may be performed manually by an operator or may be performed by a strapping machine. At step 1315, an RFID serial number or alpha-numeric code associated with an RFID tag attached or embedded within the current strap is read and recorded by the vault management system. This read operation may be performed by the strapper machine using an inbuilt reader or may be performed by the operator using a handheld reader. It is also possible to read the strap identifier before step 1310. Once the serial number or alpha-numeric code of the RFID tag has been read, a data record is created, wherein the properties of the bundle of banknotes, as recorded by the strapper machine or the operator, are associated with the strap identifier. Hence the properties and value of the bundle of banknotes may be recalled using the strap identifier as an index. The properties of the bundle of banknotes may include one or more of: number of notes, denomination of notes, quality or fitness of notes, issue number, banknote serial number etc. This association of the bundle data with the strap is performed at step 1320. In alternate embodiments, steps 1315 and 1320 may comprise writing the processing data related to a bundle of banknotes onto memory coupled to the RFID tag mounted in the strap. In this case, the strapping machine or the operator will be equipped with an RFID writing device which will write the required information to the memory coupled to the RFID tag.

At step 1325, a decision is made as to whether strapped bundles of banknotes should be strapped into bundles of even larger value. For example, a number of bundles each containing one hundred banknotes of a particular denomination may be strapped to form a larger bundle of a thousand banknotes of that denomination, i.e. by strapping ten previously strapped bundles. Again, this may be carried out by a suitably adapted strapping machine or by an operator. If strapping of strapped bundles is required, then the strapped bundles are themselves strapped at step 1335 and a strap identifier or serial number associated with an RFID tag attached or embedded within the strap applied to the strapped bundles is read at step 1340. The data associated with the previously strapped bundles and the further strapping process is then associated with the strap identifier of the larger bundle at step 1345. For example, if ten previously strapped bundles are to be strapped to create a larger bundle, then the strap identifiers of the ten previously strapped bundles may be registered with the strap identifier of the strap wrapping the previously strapped bundles. After the bundles of banknotes have been strapped one or more times, the strapped bundles are either stored or moved to an area where they may be ready for order processing at step 1330. Typically, the method 1300 is performed within the vault area 121 although it may alternatively be performed as part of the deposit processing 110 or the order processing 130.

The bundles of banknotes are then used to pick an order as shown in FIG. 6. An order is received from a customer and the ownership of the bundles is transferred from the vault area 121 or a vault operator to the order processing area 131 or an order processing operator. The order is then manually picked and a bag or container is filled according to this order. During this stage the order processing operator may optionally read the RFID serial numbers of the bundles and store these serial numbers with the customer order record. This may facilitate future auditing and customer management. After the order has been picked at step 640, the container or bag can now be sealed as each bundle of banknotes within the bag or container has been strapped with a strap incorporating an RFID tag; to verify the value of a container or bag all the operator need now do is to scan the bag or container with an RFID reader which will retrieve the RFID strap identifiers and/or the value of notes from RFID memory. If the strap identifiers are read, then these can be used as an index to a central database to retrieve the value of the bundles. Hence the value or other details of a sealed order may be verified at any other further point after the order has been picked, including during despatch processing 160. For example, before an order is loaded onto a carrier for transport to a customer, the sealed bag or container may be scanned by an operator using a handheld RFID scanner to confirm that the contents agree with the details of the order placed by that customer. As well as verifying the contents of an order using data retrieved from the RFID devices, further verification may be performed by weighing the container. Using order data retrieved from the vault management system the expected weight of the order may be calculated and compared with a measured weight of the order. This verification would involve adjusting for the weight of the container and straps. A more precise expected weight may also be calculated using the banknote data retrieved after reading the strap identifiers of the bundles within the container.

Additionally, the RFID tags on the bundle may be used to transfer ownership of the bundles. For example, once a bundle is strapped, it may be assigned to an operator in the vault processing area 121. During transfer of the bundle from the vault processing area to the order processing area 131, ownership of the bundles may be transferred as well using the methods of the present invention. This method may also allow the automatic picking of orders through automatically reading the RFID serial numbers of bundles to ascertain their value and then to use this information to automatically pick a predetermined quantity of notes for an order.

The final recipient of the cash order may also use the RFID devices attached to the strapped bundles to check that their order is correct. By scanning a container containing one or more tagged bundles that comprise a cash order, the recipient is able to confirm the value of a sealed container as discussed above. This may be performed by receiving and integrating data stored in memory coupled to each RFID device or may be achieved by using the serial numbers associated with, and read from, each RFID device to perform a query on a central database to which the customer has access. In this manner the customer may check that their order is complete before opening the container and officially accepting a delivery of an order.

As well as associating details of the banknotes with the strap identifier at step 1320, other details relating to the processing may also be associated with the serial number or alpha-numeric code of the RFID tag. For example, data such as the date of strapping or processing, time of strapping or processing, operator in charge of strapping or processing, sorting machine, strapping machine, processing performed, and/or area of processing may be associated with the RFID tag. Again, this association may be performed by storing data within memory coupled to the RFID tag or may be performed by associating the serial number or alpha-numeric code of the RFID tag with data in a database record stored within the vault management system. If a problem arises with a particular bundle of banknotes, useful data can be retrieved from the vault management system: for example, the exact machine that produced the strap may be investigated and/or the time of strapping may be linked to the security camera system in order to allow a visual check of the strapping process; alternatively if there is a note quality or authenticity concern, the sorting or strapping machine ID may be used to retrieve the sort parameters active at the time of sorting or strapping.

While the method of the sixth embodiment has been described in relation to a strap it is also possible to use alternative means to secure sorted numbers of banknotes. For example, output cassettes or envelopes may alternatively be used, wherein an RFID is inserted or attached to the cassettes or envelopes. In these cases the strapping machine will be adapted to output the collection of banknotes in the required form.

To facilitate the transfer process described in relation to FIGS. 3A and 3B radio frequency identification devices or RFID tags may be installed upon the containers used to transfer the cash. These RFID tags may be used in a similar way to the barcodes present on the containers that were described earlier.

Figure 14:
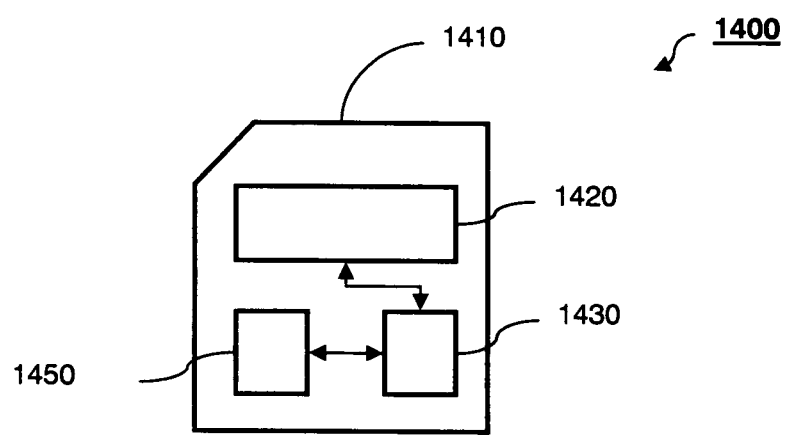
FIG. 14 is a diagram illustrating an exemplary radio frequency identification chip.

An example of a suitable RFID tag is shown in FIG. 14. The tag 1400 comprises a tag substrate 1410, an aerial 1420, a controller 1430 and optional memory 1450. The controller may comprise an integrated transmitter and/or receiver. Tag 1400 is passive and so has no internal power source. The aerial 1420 receives power from an external reader. Radio frequency signals emitted from the external reader impinge on aerial 1420 and enable the controller 1430 to modulate the received signal or to "backscatter" a carrier wave to return a signal to the external reader carrying information related to the RFID tag 1400. Typically the tag 1400 comprises memory 1450 which contains a serial number or alpha-numeric code. This serial number or alpha-numeric code identifies the tag and typically comprises a plurality of bits of data. Upon receiving a radio frequency signal from an external reader the controller 1430 is typically adapted to modulate the received signal in such a way that the tag identifier can be extracted from signals received back at the external reader.

A tag 1400 as shown in FIG. 14 may be applied to a container to facilitate the transport process shown in FIG. 3A. In the previously described example, at step 325, a barcode applied to the container was scanned in order to achieve a serial number or identifier related to the container. In the present case at step 325 an RFID tag applied to a container may be scanned to retrieve a serial number or other identifier associated with the tag. If this serial number was previously associated with the deposit items within the container then details relating to the deposit items within the container may be retrieved from central database 215 by scanning the tag and retrieving the serial number. By using an RFID tag instead of a barcode, information may be gained concerning the deposit items within a container from a distance. This may enable multiple containers comprising RFID tags to be scanned in a set area before a plurality of containers are transferred.

A container equipped with an RFID tag may also be used to record the events surrounding a transfer as described in FIGS. 3A and 3B. For example if a cash processing centre resembling FIG. 1D is used a number of passive gates adapted to interrogate RFID tags may be installed at gateways 156,116, 126 and 136. When a container comprising an RFID tag is passed through one of these passive gates, i.e. through one of the gateways 156,116,126 or 136, the RFID tag is detected and its serial number retrieved by control systems attached to the passive gates. This then allows a transfer event to be generated documenting that a transfer has occurred between two neighbouring areas joined by the detecting gateway. To determine the direction of travel of the container the retrieved serial number of a detected RFID tag may be used to query central database 215 to retrieve the last location record concerning the RFID tag in question. This retrieved location then becomes the source location and the other area bordering the gateway becomes the destination region. For example, if a container was last registered as being within deposit processing area 111 and is detected passing through gateway 116 then it is assumed that a container comprising a detected RFID chip is moving from deposit processing area 111 to vault processing area 121.

In order to provide a closed system, passive gates may also be provided on all entrances and exits to the cash processing centre. For example, turning to the exemplary cash processing centre shown in FIG. 1E passive gates may be mounted around the entrance to reception area 151 and dispatch area 161. When a plurality of containers enter the reception area 151 within a delivery vehicle then the RFID tags associated with those containers may be detected and the serial numbers associated with the detected tags may be entered in to location records in central database 215. A location record will thus record the detected containers as being located within reception area 151. Likewise when a number of containers in a delivery vehicle that contain customer orders leaves dispatch area 161, a passive gate will detect the RFID tags within the vehicle and record the associated containers as having left the cash processing centre.

If methods and apparatus according to the fifth or sixth embodiments are used then individual cash bundles may be tracked on entry and/or exit to particular areas using RFID tags located in either the header or trailer documents or the straps of bundled banknotes.

To facilitate and-to-end tracking of deposits throughout the deposit process each deposit may be linked to a particular deposit identifier from pre-advertisement at the customer's premises to deposit processing and reject handling. To do this a particular RFID identifier related to a particular RFID tag may be associated with a container containing the deposit. The container and/or the RFID tag then stays with the deposit throughout the deposit lifecycle. RFID readers at predetermined locations may then detect the RFID tag and retrieve the identifier. This then allows real-time deposit tracking. For example, RFID readers may be provided within CIT vehicles, in the reception area 151, at the preparation and machine entry areas within deposit processing area III, near or on cages temporarily storing deposit containers or within the vault. A similar system may also be used to track customer orders from the vault to the dispatch area and even possibly the CIT delivery vehicle. This would then allow complete tracking from and to the customer. CIT operators would also be able to retrieve real-time information on the status of cash orders. A plurality of RFID readers at a variety of stages during order preparation and dispatch may replace or complement existing CIT tracking systems. Using a single tracking method incorporating RFID would, however, greatly simplify the process.

Figure 19:
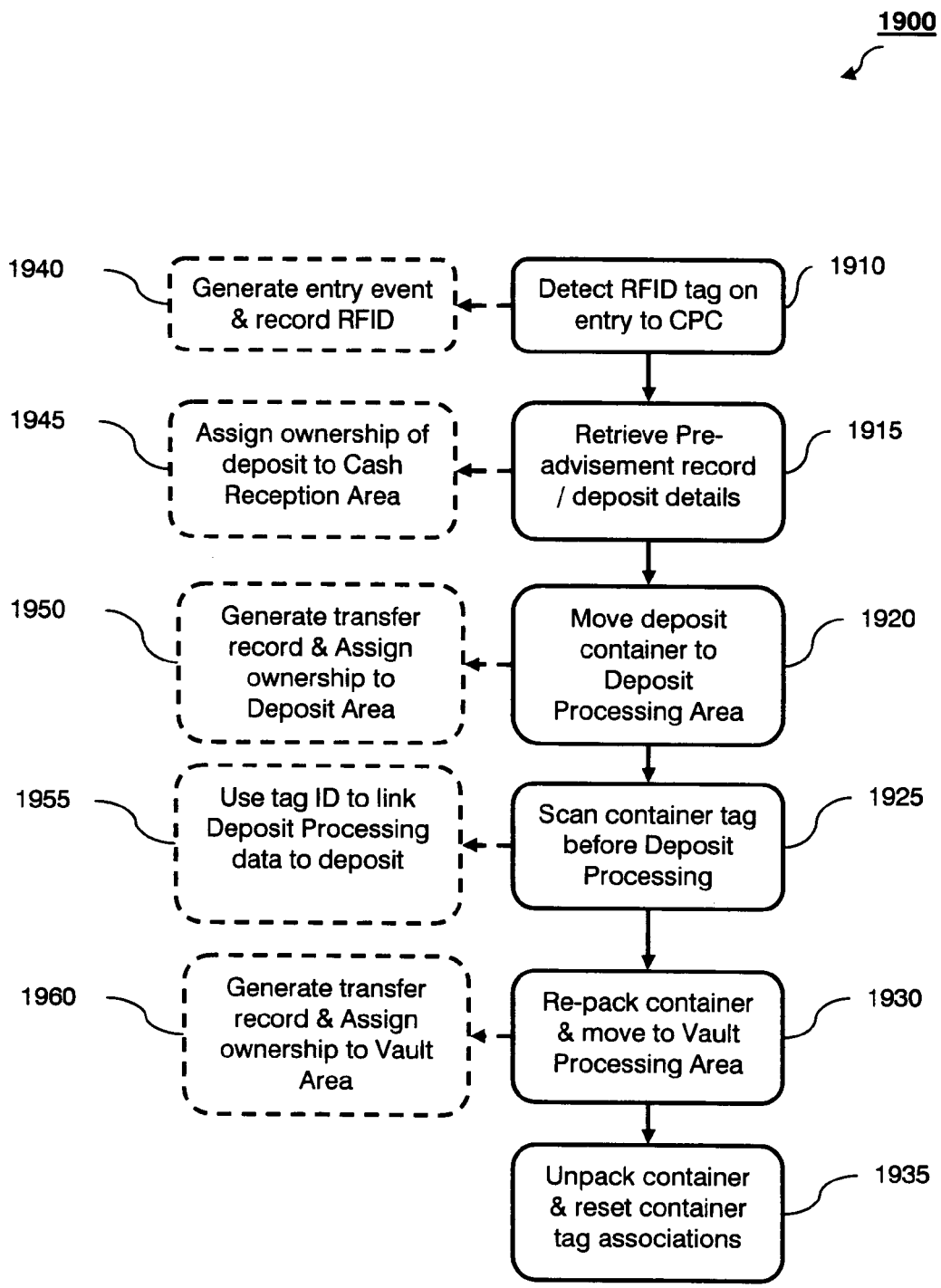
FIG. 19 is a flow chart illustrating an exemplary tracking method using a radio frequency identification device.

An example of a deposit sequence using the methods discussed above is shown in FIG. 19. At step 1910, an RFID tag attached to a container is detected on entry to the cash processing centre (CPC) and an entry event is generated at step 1940 and stored in central database 215. The RFID identifier associated with the RFID tag is also retrieved and stored in the entry event record. The vault management server 210 is then configured to, at step 1915, use the retrieved RFID identifier to retrieve a pre-advisement record containing deposit data that was generated by the customer and sent to, or recorded in, central database 215. At this point the vault management server generates an ownership transfer event at step 1945 to assign ownership of the deposit stored within the tagged container to the reception area 151. The deposit may be referenced using the deposit reference generated in step 1255 of FIG. 12. After reception processing has been performed the container, and thus deposit, is moved at step 1920 to the deposit processing area 111. This typically involves passing the container through a gateway with an associated RF scanning reader attached. The scanning reader detects the RFID tag attached to the container and sends a message to the vault management server 210. The vault management server 210 then looks up the previous position of the RFID tag (or associated deposit) and uses this to determine the direction of travel through the gateway. The vault management server 210 is then configured, at step 1950, to generate a transfer record indexed by the retrieved RFID identifier of the RFID tag and to assign ownership of the associated deposit to the deposit processing area 111. At step 1925, an operator or banknote sorter scans the RFID tag before deposit processing takes place so that data generated by the deposit processing can be compared, and possibly reconciled, with the original deposit data generated as part of steps 1265 in FIG. 12. This comparison is performed at step 1955 and the result is stored in the central database 215. After deposit processing, at step 1930, the container is repacked with the deposit and then transferred to the vault processing area 121 for unloading and storage. During the physical transfer of the container from the deposit processing area 111 to the vault processing area 121, another gateway scanning reading detects the RFID tag and a transfer record and ownership assignment are generated at step 1960, in a similar manner to step 1950. Within the vault the container is unpacked and the RFID tag attached to the container is de-allocated from the deposit removed from the container at step 1935.

Figure 15A:
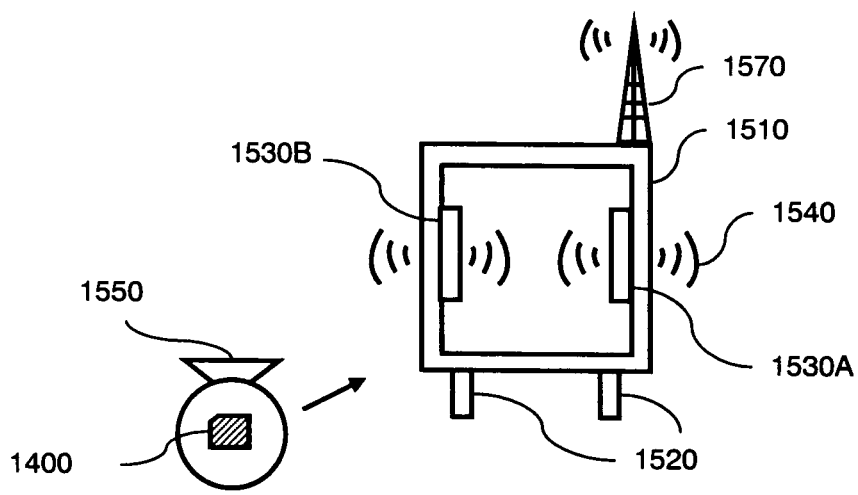
FIGS. 15A and 15B are diagrams respectively illustrating a front and side view of an exemplary storage unit for use within a cash processing centre.
Figure 15B:
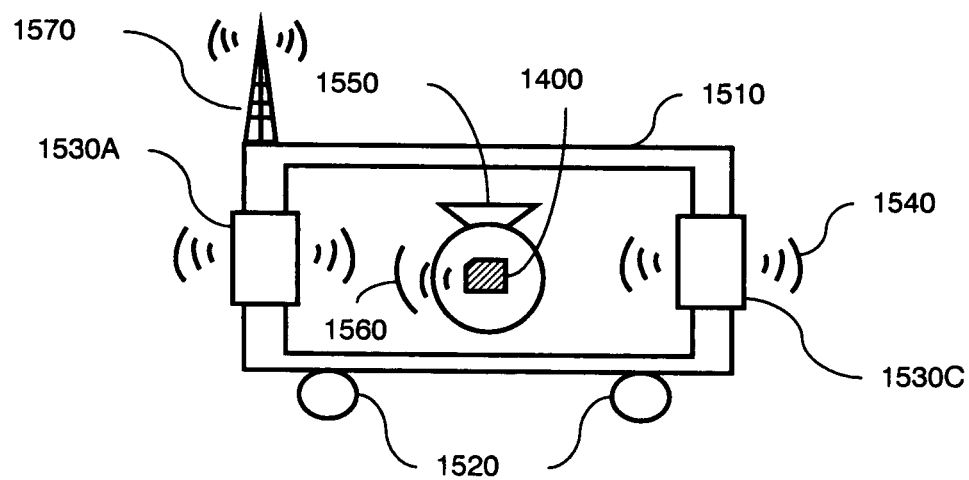

Another use of RFID tag 1400 is shown in FIGS. 15A and 15B. In this example the cages or trolleys that are used to respectively store or transport containers within the cash processing centre are equipped with RFID passive scanning gates in order to detect any RFID tags placed within them. If each RFID tag is associated with a container then the location of containers containing cash deposits can be traced throughout the cash processing centre. FIG. 15A shows an end view of a trolley 1510 for transporting containers around the cash processing centre. The trolley 1510 has a number of wheels 1520 which enable it to be wheeled around the different areas of the cash processing centre. The trolley 1510 is further provided with one or more RFID passive scanning readers 1530 which are attached to the trolley 1510. In the present example the trolley comprises four passive RFID readers, one mounted in each vertical corner member of the trolley. In use, the trolleys transport a number of containers 1550 around the cash processing centre. These containers 1550 have an associated RFID tag 1400, for example wherein tag substrate 1410 is affixed to the side of a container. At predetermined intervals each passive scanning gate 1530 will emit a number of radio frequency signals 1314 which are used to detect the presence of an RFID tag within the range of each passive scanning reader. An RFID tag may be detected by modulating or backscattering the radio frequency signals 1540 as described earlier. Thus the serial number or identifier associated with any RFID tag in the location of each passive scanning reader may be retrieved. In FIG. 15A no container is placed upon the trolley 1510 and thus no backscatter signal is received by the passive RFID scanning readers 1530.

FIG. 15B shows a side view of the trolley 1510, wherein a container 1550 has now been placed upon the trolley. When a container 1550 comprising an RFID tag 1400 is placed upon the trolley 1510, the RFID tag 1400 backscatters one or more of the radio frequency read signal 1540 emitted by the passive scanning readers 1530. In the example shown in FIG. 15B, passive scanning reader 1530A is the closest device to container 1550 and so reader 1530A receives a response signal 1560 that has been modified by tag 1400. Reader 1530A thus detects the response signal 1560 and decodes the serial number associated with RFID tag 1400. Hence, the number of containers present within the trolley 1510 may be detected by the passive scanning readers 1530 and the serial numbers of each tag attached to each container may also be retrieved. In the present example the trolley 1510 is mobile and so the trolley further comprises a wireless transmitter 1570 which allows the reading apparatus 1530 to communicate over a wireless network with the vault management system running on server 210. The serial numbers associated with the RFID tag can then be related to containers and deposits so that the location of each deposit may be known.

A cage may also be adapted as described above and will typically resemble the trolley 1510 in FIGS. 15A, 15B without the presence of the wheels 1520. Both cages and trolleys may be provided with doors and/or panels on one or more sides of the frame 1510. The passive scanning readers 1530 may alternatively comprise a closed loop antenna mounted around the edges of the cage or trolley, e.g. forming a closed loop around all four edges of the trolley or cage. The passive scanning readers 1530 may also be placed on the top and bottom of the cage and/or trolley as well as or instead of being placed on the sides of the trolley and/or cage. As a cage is typically stationary the detection control systems linked to the passive scanning readers 1530 may also be linked to the central databases over a standard wired Ethernet link. The RFID tags may also comprise active or powered RFID tags and thus the passive scanning readers 1530 will comprise active scanning readers.

By using cages and/or trolleys with built-in RFID scanning readers the vault management software is able to track which containers move in and out of each trolley and/or cage within the cash processing centre. Hence, an operator or manager may be able to instantly find out the value of any cage and/or trolley within the centre by retrieving the cash or deposit information that has been associated with each container or the RFID tag 1400. In certain cash processing centres each cage and/or trolley may have a certain insurance limit. This means that the cage and/or trolley can only be loaded with a certain amount of cash. The RFID scanning reader thus allows the value of any cage and/or trolley to be calculated by the vault management system and if the insurance limit is exceeded then a warning can be displayed. Events that record when a container 1550 enters a cage and/or trolley may also be used together with CCTV systems to retrieve video footage of the container being placed into the cage and/or trolley or being removed from the cage and/or trolley.

In a variation to the apparatus shown in FIGS. 15A and 15B the trolley 1510 may itself comprise an RFID tag 1400. When a container 1550 is placed upon the trolley 1510 the RFID tag of the trolley and the RFID tag of the container are read by a handheld reader or a static reader in the vicinity of the trolley. The identifier of the RFID tag attached to the trolley is then linked to the identifier of the RFID tag attached to the container on the trolley. The trolley and the container may then be linked within the vault management system, e.g. within database 215, to allow the location of container 1550 to be ascertained. At certain intervals a RFID scanning reader external to the trolley 1510 may then be used to scan the trolley to verify that the records stored within the vault management system, i.e. the number of container tags present on the trolley, match the data stored in the database.

In a similar manner, the trays that are loaded with cash deposits before processing by a banknote sorter or currency sorting machine may also comprise an associated RFID tag. If the methods of identifying bundles of cash used in the fifth and sixth embodiments are used then the bundles of cash present upon a tray may be linked with an identifier associated with the RFID tag attached to the tray by scanning the tray any accompanying deposits with an RFID reader. This then returns the tray tag identifier and the deposit identifiers which can then be linked within the vault management system. Hence the vault management system is able to keep a record of the expected value of each tray within the cash processing centre. By keeping track of the value of each bundle of cash placed on the tray a manager may also be provided with information about the total value of cash upon the tray. This total value of the tray may be used to keep within insurance limits and/or used to track whether there is enough deposited cash to keep the banknote sorter or currency sorting machine running at a predetermined capacity. If a tray is scanned before a processing operation upon the currency processing machine 260 is performed, then the data associated with the processing of the deposits upon the tray may be verified against data related to the deposits that were recorded before the operation. The banknote sorter or currency sorting machine may also be adapted to use a list of expected cash bundle or header card identifiers and thus the sorter or machine may be further adapted to stop operation if an RFID tag is detected that has an identifier that is not on the list.

An extension of the use of RFID tags and RFID readers to ascertain the location of cash within the cash processing sensor, both in the form of customer deposits and orders, involves the use of an advanced active RFID device in association with a wireless positioning system. The example below is described in relation to a wireless trilateration system, however the methods and systems may be adapted to operate using other known positioning systems, such as those that involve wireless triangulation or global positioning systems such as NAVSTAR GPS.

Wireless trilateration systems typically allow location tracking of suitably adapted RFID devices using a wireless local area network (LAN). Typically, an IEEE 802.11 compliant wireless LAN is constructed with a plurality of wireless access points. A RFID device is then adapted to communicate with these access points upon the wireless LAN using standard protocols and each RFID device may be uniquely identified by an address string such as the network MAC address of the RFID device. In use, when an RFID device communicates with three or more wireless access points the RFID device may be located by examining the signal strength of radio frequency communications between the RFID device and each of the three or more access points. Such a system is easy to implement using existing wireless LAN infrastructure that has been designed for data communication. An example of a suitable wireless trilateration system is that provided by Pango Networks Incorporated.

Figure 17:
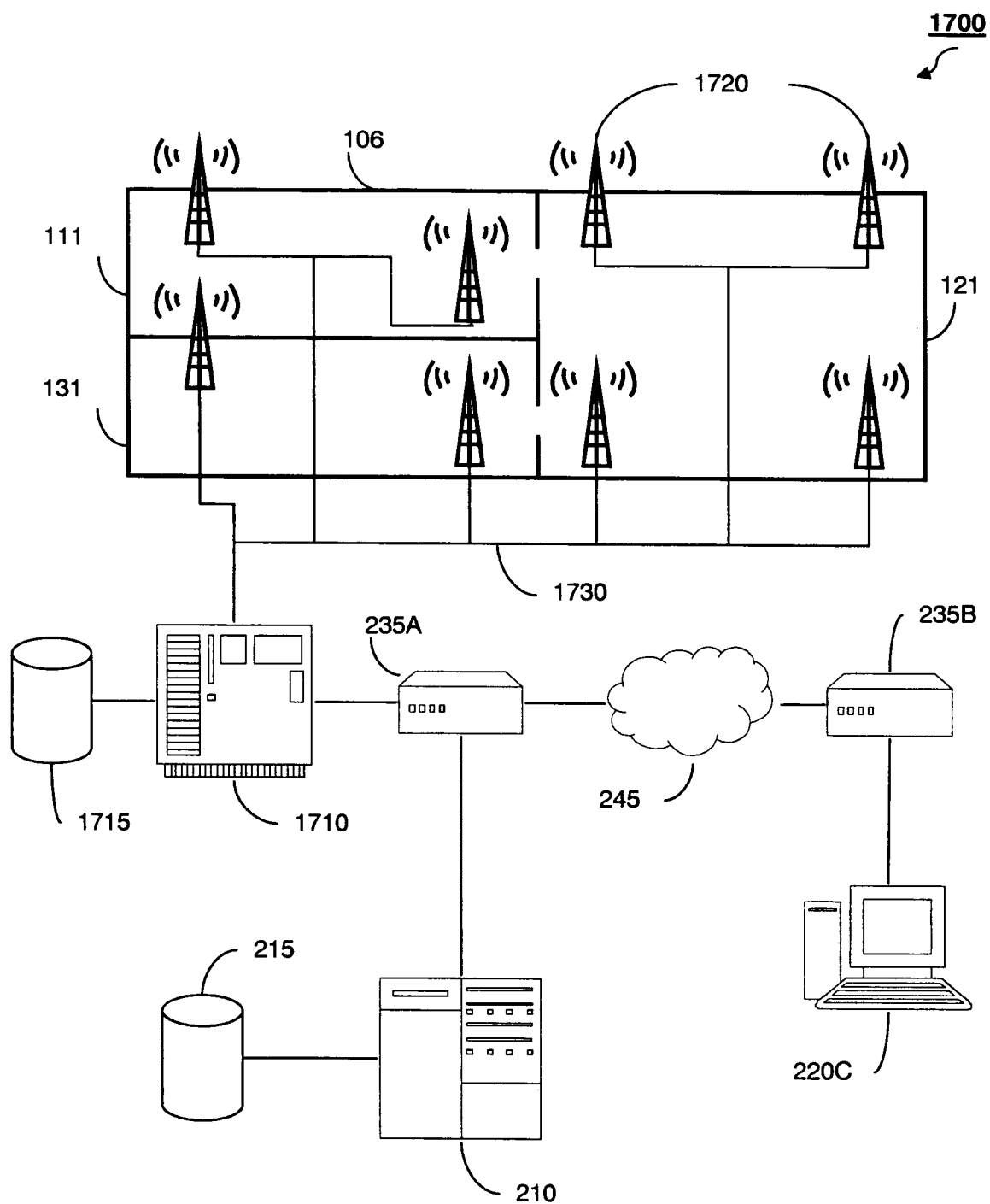
FIG. 17 is a diagram illustrating an exemplary hardware configuration of a wireless trilateration system.

A seventh embodiment of the present invention directed to a wireless trilateration system adapted for use in a cash processing centre is shown in FIG. 17. This example features a simplified cash processing centre as described in relation to the first embodiment; however the wireless trilateration system may be expanded for use in a cash processing centre of any size or layout. Each area of the exemplary cash processing centre 106 has a number of wireless access points 1720. In the present example, two wireless access points are positioned in the deposit 121 and order 131 processing areas and four wireless access points are positioned within the vault processing area 121. The access points are positioned so that an RFID device located anywhere within the cash processing centre will be able to communicate with at least three access points at any one time. In the present example, the access points are connected to a wired Ethernet network 1730. This wired network 1730 is connected to a location server 1710. The location server 1710 is configured to send data to and receive data from the access points 1720.

Location server 1710 is connected to the vault management server 210 via a network comprising router 235A. Hence, the location server 1710 is integrated into the vault management system in a similar way to the CCTV system shown in FIG. 8. The location server 1710 is also accessible from a remote client workstation 220C. This remote workstation 220C communicates with the server 1710 via router 235B, WAN 245 and router 235A. In certain embodiments of the present invention the location server 1710 may be incorporated within the vault management server 210 rather than being incorporated in separate hardware as shown in FIG. 17.

Articles to be tracked within the cash processing centre are typically equipped with an RFID device. These articles may comprise one or more of cages, guns, employees, bullion, trays, containers, cash bundles, trolleys, banknote sorters, and any other equipment used within the cash processing centre. Each RFID device is designed to communicate with the access points 1720 forming the wireless LAN. In use, due to the careful positioning of the access points within the cash processing centre, each RFID device should be able to communicate with at least three access points.

In the present example, the RFID device is adapted to emit a radio frequency signal or "chirp" containing a unique device identifier at predetermined intervals. For example, the RFID device may emit a number of bits comprising the device MAC address at 20-second intervals. This signal or chirp is detected by any access points within range of the RFID device. Each of the access points within range then processes the received signal or chirp and forwards a message comprising the detected signal strength of the received signal and the unique device identifier to the location server 1710 over network 1730. The location server 1710 is then adapted to use the received signal strength and device identifier from at least three access points to calculate the position of the RFID device and hence calculate the location of the article of interest. Typically, this is achieved by calculating the distance of the tagged object from the at least three receivers based on the signal strength and known signal attenuations over a set distance. The position of the object can then be found using standard geometry. Using such a system articles can typically be located to within 0.5 meters.

In an alternative embodiment, directional antennas may be used in a triangulation system to detect the position of a tagged object. In this case only two directional receivers need be used. When a "chirp" is received from a tagged device each receiver records the direction in which the "chirp" has a maximum measured power or intensity. Two angles are then calculated from the directions detected by both detectors and these angles are used together with the known distance between the detectors to calculate the position of the object. Such a system could operate on similar hardware to that shown in FIG. 17.

In the present example, the calculated location is used to update a location database 1715. Location database 1715 may comprise an object orientated database comprising a collection of object records corresponding to each of the tagged articles within the cash processing centre. Each object record may be indexed and retrieved using the unique device identifier of the RFID device attached to each article. Each object record also has a location property. This location property may be given as a 2-dimensional coordinate corresponding to a location within the cash processing centre. To enable real time or near real time monitoring of articles within the cash processing centre this location property may be updated at predetermined intervals using the calculated location information.

Figure 18:
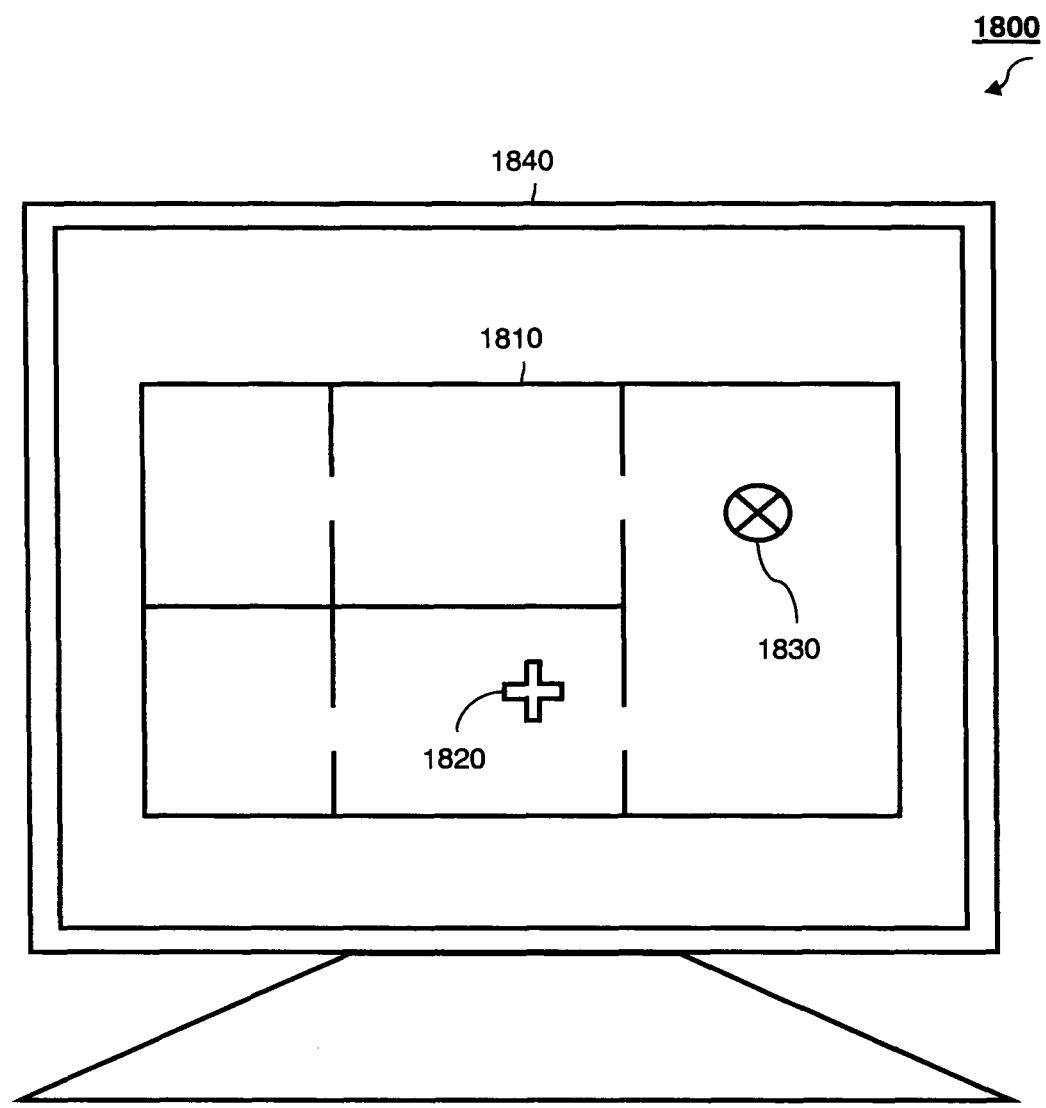
FIG. 18 is a diagram illustrating an exemplary workstation running a location module.

FIG. 18 illustrates how the location server 1710 and location database 1750 are used to track articles within a cash processing centre. FIG. 18 shows an example client terminal or workstation 1840. This workstation could be remote workstation 220C as shown in FIG. 17. The workstation 1840 runs a location module that operates as part of the vault management system. This location module comprises a client application that operates upon the workstation 1840 and that communicates with the location server 1710 to provide location information. In alternative embodiments the client application may instead communicate with the vault management server 210, wherein the vault management server 210 in turn communicates with the location server 1710. The client application may be an Internet or "web" browser adapted to communicate with one or more of the location server or the vault management server acting as an Internet or "web" server.

The location module displays a schematic plan 1810 of the cash processing centre on a suitably designed graphical user interface. The location of various articles 1820 and 1830 are then superimposed on this plan 1810. This may be achieved by retrieving the location property of a given article from the location database 1715. In FIG. 18 a first article 1820 is shown as being located in the deposit processing area 131 and a second article 1830 is shown as being located in order processing area 121. The icons associated with each article may then move around the schematic plan 1810 in real-time as the location property of each object is updated by the location server 1710 (or near real-time depending on the update interval). The location module may further be adapted to alert an operator when a selected article travels to an unauthorized area, for example outside of the building limits. The location system shown in FIGS. 17 and 18 may also by integrated with cash in transit (CIT) tracking and GPS (Geographical Positioning System) data to provide the real or near real time geographic location of a deposit or a cash bundle. For example, such data may be displayed on a third party mapping system that provides schematics maps of the area or country of operation. This mapping system may also provide a map of the customer's premises, the cash processing centre, and any stop off points along the route of the CIT operator. The history of when a particular RFID tag was scanned and detected may also be added to the location map using transfer or detection event information stored in central database 215. By processing location data collected over time, average timings of transport and standard routes both inside and outside the cash processing centre may be established. Security alarms may then be raised if an article is detected as deviating from an established route.

Figure 16:
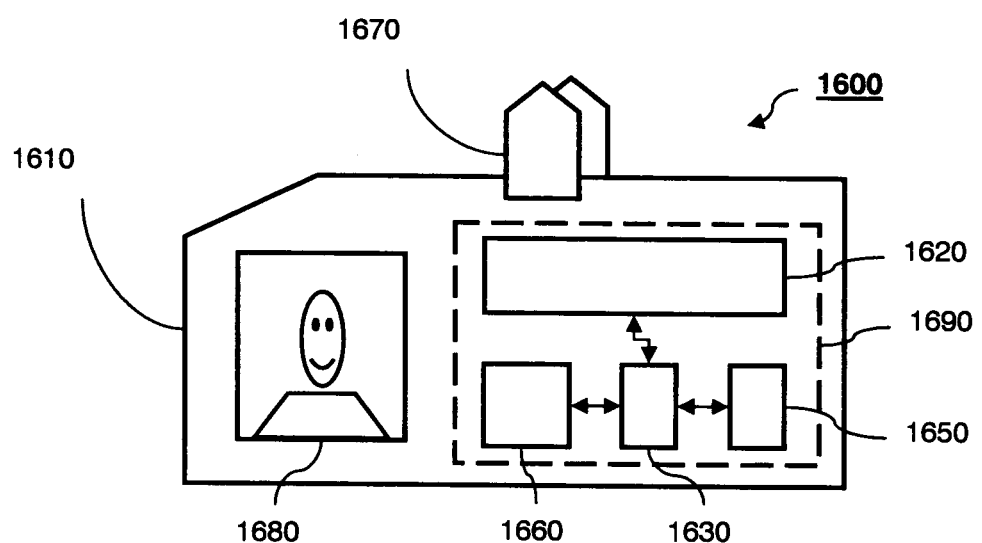
FIG. 16 is a diagram of an exemplary employee badge incorporating a radio frequency identification device.

An RFID badge for use in tracking employees or operators using the methods described above is shown in FIG. 16. The badge 1610 comprises a photo of the employee 1618 and a clip 1670 for attaching the badge 1610 to the employee's clothing. Inside the badge (as represented by dotted lines 1690) is located an antenna 1620, a controller 1630, a power supply 1660, and memory 1650. The antenna 1620, controller 1630 and memory 1650 operate in a similar manner to the passive RFID tag shown in FIG. 14, however in the present case power supply 1660 allows a stronger signal to be emitted by antenna 1620 and more advanced processing to be performed by controller 1630. Even though the badge in FIG. 16 is described as using active RFID methods, it is also possible to use the apparatus of FIG. 14 to produce a passive RFID badge. Each RFID controller 1630 may then be adapted to communicate with at least three access points 1720 within the cash processing centre to locate the employee.

As well as tracking employees around the cash processing centre the RFID badges may also be used to recognize the presence of an employee in front of a workstation. When an employee enters a location range in front of a particular workstation the vault management system may be adapted to compare the identity of the employee, their present location and their security status to automatically log them on to the vault management module relevant to their job with the cash processing centre. Alternatively the RFID badge 1610 may be swiped or passed underneath an RFID reader to log in and out of the vault management system on a client workstation. RFID cards may also be used with biometrics and fingerprint identity systems. By combining the RFID badge with one or more additional security systems a manager can be confident that only authorized users may access the vault management system and thus be confident of the integrity of any information being inputted into the system. Data associated with the location of the employees may also be used to track employees working hours.

Any of the methods described in this specification may be implemented in software using known software development techniques, in dedicated hardware using appropriately configured logic units or in programmable hardware adapted to process digital instruction sets.

The invention claimed is:

1. A method of processing a plurality of articles of value within a cash processing centre comprising:
sorting a plurality of articles of value according to one or more predetermined criteria using a sorting device;
recording data corresponding to properties of the sorted articles of value;
strapping the plurality of sorted articles of value with a strap that is physically coupled to a radio frequency identification device to produce a strapped bundle; and
electronically associating the data corresponding to the properties of the sorted articles of value with data corresponding to the radio frequency identification device.

2. The method of claim 1, wherein the method further comprises:
strapping a plurality of strapped bundles with a strap that is coupled to a further radio frequency identification device; and
electronically associating data corresponding to the properties of the plurality of strapped bundles with data corresponding to the further radio frequency identification device.

3. The method of claim 1, wherein the method further comprises:
electronically associating data corresponding to the radio frequency identification device with additional data comprising one or more of: a date of strapping or processing, a time of strapping or processing, an operator in charge of strapping or processing, details of the sorting device, details of the strapping device, details of the sorting performed and the area where sorting was performed.

4. The method of claim 1, wherein the step of electronically associating data comprises:
reading an identifier associated with the radio frequency identification device; and
generating a data record comprising the properties of the sorted articles of value and any optional additional data, the data record being indexed by the identifier.

5. The method of claim 1, wherein the step of electronically associating data comprises:
writing data corresponding to the properties of the sorted articles of value and any optional additional data to memory coupled to the radio frequency identification device using a radio frequency writing device.

6. The method of claim 1, wherein the method further comprises:
retrieving data corresponding to the properties of the strapped articles of value and any optional additional data by reading data corresponding to the radio frequency identification device using a radio frequency reader.

7. The method of claim 6, wherein the data is retrieved from a database record.

8. The method of claim 6, wherein the method further comprises:
sealing the strapped articles of value within a container; and
retrieving data without unsealing the container by reading data corresponding to the radio frequency identification device from outside the container using a radio frequency reader.

9. The method of claim 8, wherein the retrieved data is used to check a customer order before accepting a delivery of the articles of value.

10. The method of claim 1, wherein the one or more predetermined criteria comprise one or more of: denomination, currency, fitness, issue and banknote recycling framework (BRF) type.

11. The method of claim 1, wherein the articles of value comprise banknotes.

12. An apparatus for sorting and grouping a plurality of articles of value comprising:
a processing unit adapted to sort the plurality of articles of value and to generate processing data;
a strapping unit adapted to strap a plurality of sorted articles using a strap, the strap being physically coupled to a radio frequency identification device; and
a controller configured to associate the processing data corresponding to a strapped plurality of articles of value with data associated with the radio frequency identification device coupled to the strap used to group the plurality of articles of value.

13. The apparatus of claim 12, further comprising:
a radio frequency scanning device adapted to read data from a radio frequency identification device.

14. The apparatus of claim 12, further comprising:
a second strapping unit to further strap a plurality of previously strapped articles of value.

* * * * *